(12) United States Patent
Altaras

(10) Patent No.: US 10,091,899 B1
(45) Date of Patent: Oct. 2, 2018

(54) DIGITAL DEVICE PROTECTIVE ARTWORK CASE METHOD AND DEVICE

(71) Applicant: Eli Altaras, Irvine, CA (US)

(72) Inventor: Eli Altaras, Irvine, CA (US)

( * ) Notice: Subject to any disclaimer, the term of this patent is extended or adjusted under 35 U.S.C. 154(b) by 0 days.

(21) Appl. No.: 15/795,578

(22) Filed: Oct. 27, 2017

(51) Int. Cl.
  *G06F 17/50* (2006.01)
  *H05K 5/02* (2006.01)
  *H02J 7/00* (2006.01)

(52) U.S. Cl.
  CPC .......... *H05K 5/0247* (2013.01); *H02J 7/0042* (2013.01); *H02J 7/0047* (2013.01); *G06F 17/50* (2013.01); *G06F 2217/12* (2013.01); *G06F 2217/41* (2013.01)

(58) Field of Classification Search
  None
  See application file for complete search history.

(56) References Cited

U.S. PATENT DOCUMENTS

| | | | | |
|---|---|---|---|---|
| 2005/0116334 A1* | 6/2005 | Buehler | ............... | H04B 1/3888 257/704 |
| 2008/0313552 A1* | 12/2008 | Buehler | ................. | G06Q 10/10 715/760 |
| 2009/0009945 A1* | 1/2009 | Johnson | ................. | G06F 1/1613 361/679.27 |
| 2013/0249358 A1* | 9/2013 | Stevenson | ............ | H05K 5/0004 312/223.1 |
| 2014/0065948 A1* | 3/2014 | Huang | ................. | H05K 5/0086 455/7 |
| 2017/0080251 A1* | 3/2017 | Yehezkel | ............. | A61N 5/0624 |
| 2017/0187853 A1* | 6/2017 | Dukerschein | .......... | A45C 11/00 |

OTHER PUBLICATIONS

Luvvitt Press Kitm, accessed frin www.luvvitt.com, 2013, International CES Las Vegas Convention. (Year: 2013).*

\* cited by examiner

*Primary Examiner* — Cedric Johnson
(74) *Attorney, Agent, or Firm* — Edmond DeFrank

(57) ABSTRACT

The embodiments disclose a method for creating a digital device protective artwork case conforming to digital device shapes and sizes and includes electronically stitched artwork designs that seamlessly wraparound the digital device protective artwork case, a shock absorbing flexible bumper core with flexible buttons to operate digital device buttons, a flexible back, a hard outer shell back, a hard outer shell portable charger external battery with blinking LED eyes battery level indicators, a tempered glass front face, a digital device protective artwork case website including at least one processor, at least one digital electronic stitching processor, at least one database, at least one communication device, an internet connection, and at least one manufacturing data interface to transfer user selections of protective artwork case styles and stock artwork designs to at least to at least one manufacturing device including an electronically stitched image application device and a mold material depositing device.

19 Claims, 24 Drawing Sheets

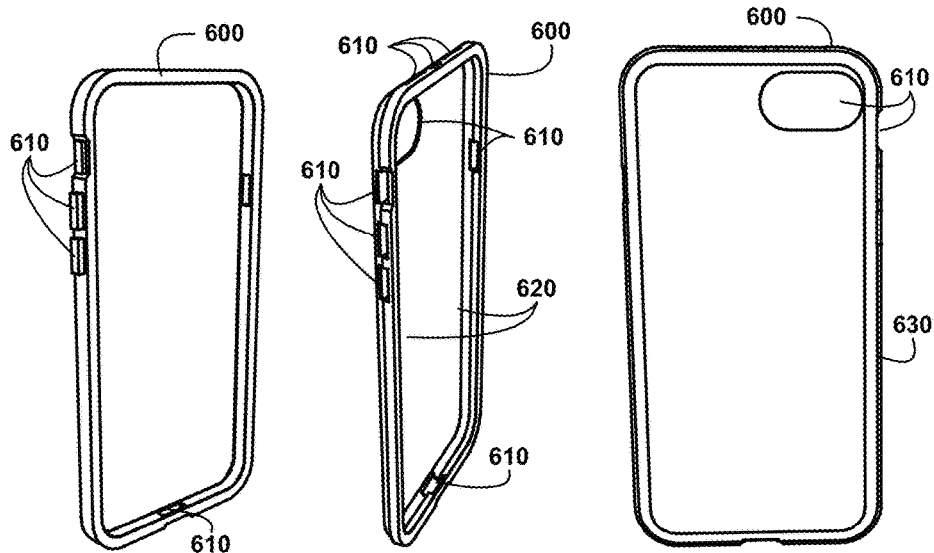
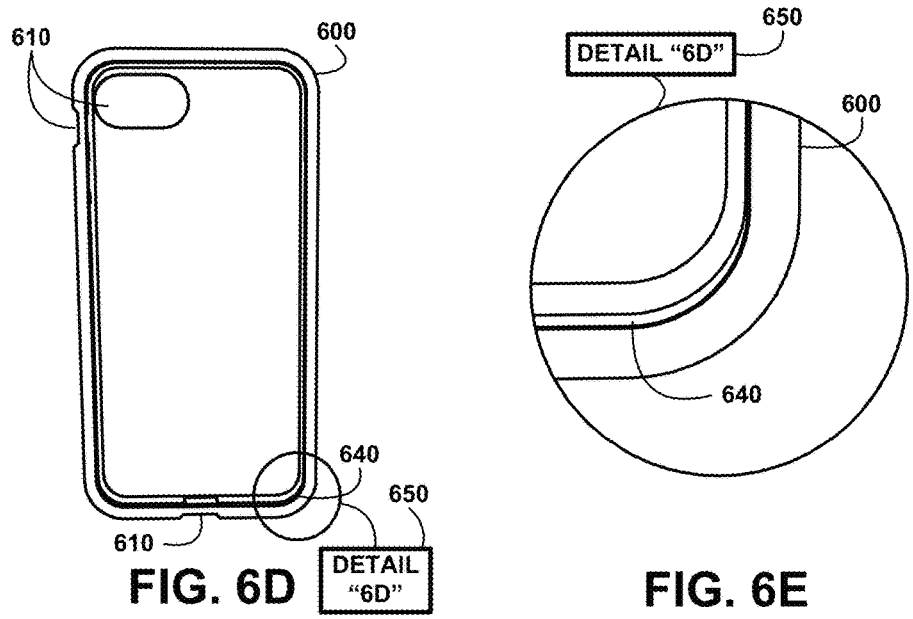
FIG. 6A    FIG. 6B    FIG. 6C
FIG. 6D    FIG. 6E

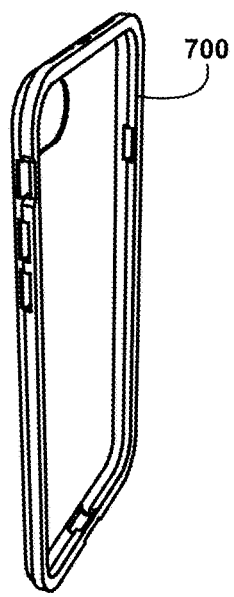
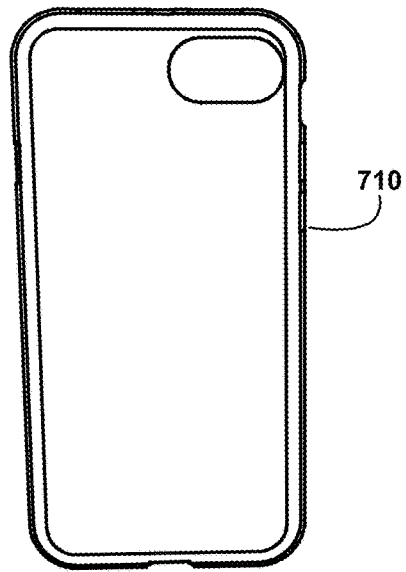
FIG. 7A                FIG. 7B
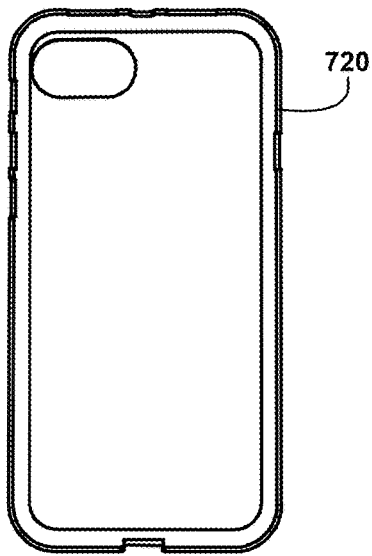
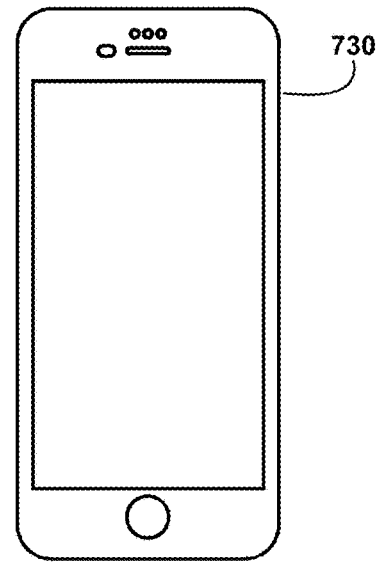
FIG. 7C                FIG. 7D

| DIGITAL DEVICE PROTECTIVE ARTWORK CASE STYLES — 1800 |
|---|
| A SINGLE LAYER SOFT OR HARD SHELL CASE — 1810 |
| A FLEXIBLE BUMPER WITH TEMPERED GLASS ON BOTH SIDES — 1811 |
| A PRINTED ARTWORK FRONT FACE FILM — 1812 |
| CUSTOM PRINT ARTWORK GLASS + STOCK PRINT ARTWORK CASE — 1813 |
| STOCK GLASS + CUSTOM PRINT ARTWORK CASE — 1814 |
| CUSTOM GLASS + CUSTOM CASE — 1815 |
| STOCK CASE + STOCK GLASS — 1816 |
| STOCK CASE + CLEAR GLASS — 1817 |
| STOCK CASE + NO GLASS — 1818 |
| SCREEN SAVER WITH MORE IMAGES THAT WILL MATCH THE TEMPERED GLASS — 1819 |
| FLEXIBLE BUMPER CASE WITH TEMPERED GLASS BACK — 1820 |
| FLEXIBLE BUMPER CASE WITH PRINTED ARTWORK TEMPERED GLASS BACK — 1821 |
| TEMPERED GLASS BACK THAT STICKS TO A DIGITAL DEVICE WITH A FLEXIBLE BUMPER AROUND — 1822 |
| PRINTED FLEXIBLE BUMPER AND FLEXIBLE BACK — 1823 |
| PRINTED ARTWORK TEMPERED GLASS BACK THAT STICKS TO A DIGITAL DEVICE WITH A FLEXIBLE BUMPER AROUND — 1824 |
| CLEAR TEMPERED GLASS BACK AND FRONT THAT STICKS TO A DIGITAL DEVICE WITH A FLEXIBLE BUMPER AROUND — 1825 |
| PRINTED ARTWORK TEMPERED GLASS BACK AND FRONT THAT STICKS TO A DIGITAL DEVICE WITH A FLEXIBLE BUMPER AROUND — 1826 |
| PRINTED FLEXIBLE BUMPER, TEMPERED GLASS STUCK TO FLEXIBLE BACK — 1827 |
| STOCK CASE WITH INSERT FOR GLASS OR PLASTIC OR FILM PATTERN — 1828 |
| A PRINTED SINGLE LAYER SOFT OR HARD SHELL CASE — 1829 |

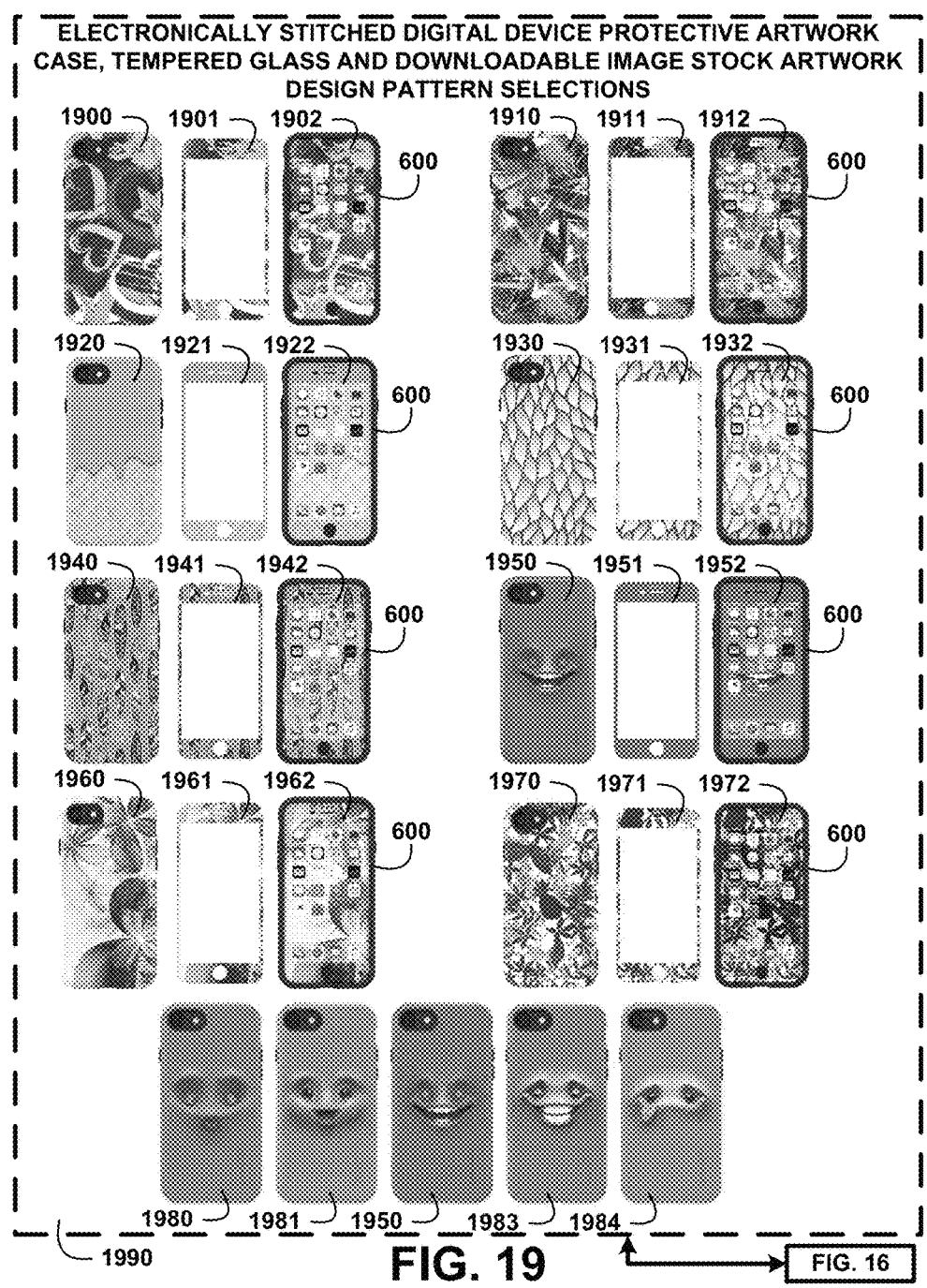

DIGITAL DEVICE PROTECTIVE ARTWORK CASE METHOD AND DEVICE

BACKGROUND

When digital devices came onto the market they generally had functional design styling. Since that time consumers have shown a desire for more stylish devices along with expanded functionality. The current prevalence of digital devices includes a large variety of types including cell phones, smart phones, tablets, pods, laptops and others. The prices of these conveniences have dropped from the beginning to be more affordable to the general public. But, the prices are still an investment for most people. Unfortunately on occasions a user loses their grip on the digital device and it falls to a hard landing and is damaged. The cost of repair or replacement can be out of a user's immediate reach and at least causes the user great concern and at times trauma by being cut off from friends and family and even their work responsibilities. What is needed is a cost effective method to not only protect the digital device from damage but also allow the user to add styling to what might be a device that lacks their desired appeal and set it apart from the thousands of look-alike digital devices out in the public view.

BRIEF DESCRIPTION OF THE DRAWINGS

FIG. 6A shows for illustrative purposes only an example of digital device protective artwork case flexible bumper of one embodiment.

FIG. 6B shows for illustrative purposes only an example of digital device protective artwork case flexible bumper and back of one embodiment.

FIG. 6C shows for illustrative purposes only an example of digital device protective artwork case flexible bumper and back rear view of one embodiment.

FIG. 6D shows for illustrative purposes only an example of digital device protective artwork case flexible bumper and back front view of one embodiment.

FIG. 6E shows for illustrative purposes only an example of flexible bumper front tempered glass attachment ledge detail of one embodiment.

FIG. 7A shows for illustrative purposes only an example of a digital device protective artwork case hard outer shell prospective view of one embodiment.

FIG. 7B shows for illustrative purposes only an example of a digital device protective artwork case hard outer shell rear view of one embodiment.

FIG. 7C shows for illustrative purposes only an example of a digital device protective artwork case hard outer shell front view of one embodiment.

FIG. 7D shows for illustrative purposes only an example of a tempered glass front face of one embodiment. FIG. 5 shows for illustrative purposes only an example of a tempered glass screen protector of one embodiment.

FIG. 18 shows a block diagram of an overview of digital device protective artwork case styles of one embodiment.

FIG. 19 shows for illustrative purposes only an example of stock print case and stock glass selections of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the embodiments.

General Overview:

It should be noted that the descriptions that follow, for example, in terms of digital device protective artwork case method and device is described for illustrative purposes and the underlying system can apply to any number and multiple types of digital devices. In one embodiment of the present invention, the digital device protective artwork case method and device can be configured using various specific digital device model customized shapes and sizes. The digital device protective artwork case method and device can be configured to include different shock absorbing case components and can be configured to include at least one tempered glass and alternatively a film screen protective component using the embodiments.

The term "seamless" and "seamlessly" as used herein refer to the results of the artwork design images applied to the digital device protective artwork case physical components and the digital downloadable image component being processed and electronically "stitched" to the image on the case to the top, sides and bottom of the subject component. Electronic stitching of the artwork design to the adjoining corresponding image creates the visualization of an unbroken transition of the artwork design images and patterns from one component to another of one embodiment.

Electronic stitching is performed in a digital electronic stitching process. The digital stitching process includes stock artwork designs and user submitted artwork designs. Artwork designs are digitized and aligned along digital device protective artwork case physical and digital component adjacent boundaries from one component to another. The digital stitching process is configured to factor into the process curvatures, prospective, image and pattern content continuations, area-based and edge-based alignments. The digital stitching process creates an appearance of an integral flow of continuous artwork design images and patterns without misalignments, disproportionate sizes, and inappropriate abrupt changes in image and pattern content of one embodiment.

The term "downloadable image", "home screen", "screen saver" are interchangeably used herein to refer to an artwork design digitally formatted for display usages on a digital device for example a home screen, a screen saver or other user desired usage. The artwork design digitally formatted can be downloaded by a user onto their digital device.

Figure 1:
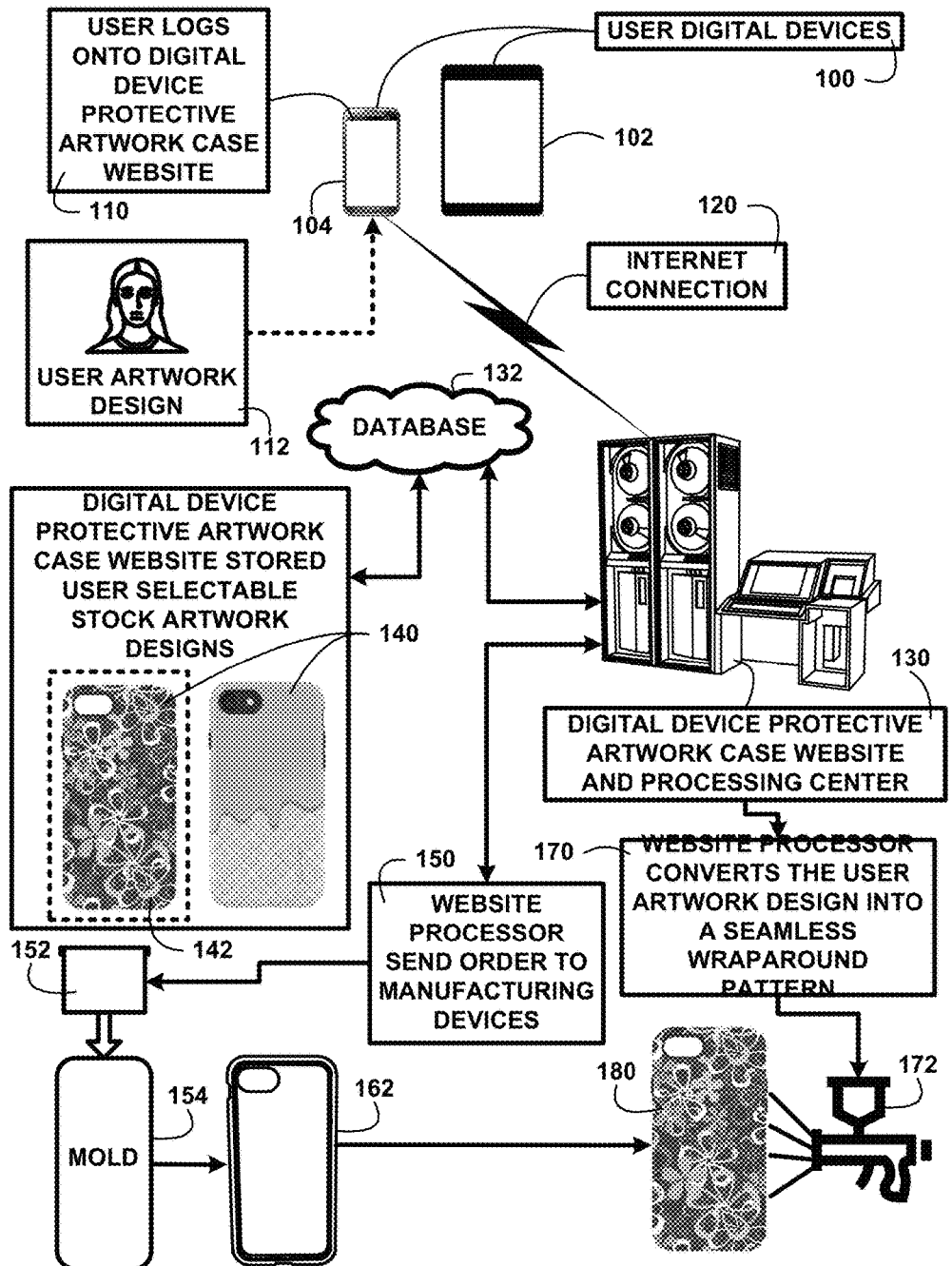
FIG. 1 shows a block diagram of an overview of a digital device protective artwork case method and devices of one embodiment.

FIG. 1 shows a block diagram of an overview of a digital device protective artwork case method and devices of one embodiment. FIG. 1 shows user digital devices 100 including a tablet 102 and cell phone 104 wherein a user logs onto a digital device protective artwork case website 110. The user may load a user artwork design 112 onto user digital devices 100 for uploading via an internet connection 120 to the digital device protective artwork case website 110.

A digital device protective artwork case website and processing center 130 includes at least one database 132 for website stored user selectable stock artwork designs 140 and website stored user selectable digital device protective artwork case styles. In this example a user selected stock artwork is inputted into the processing center 142. Website processors send order to manufacturing devices 150 where case materials poured into mold 152. A mold 154 for various makes and models of user digital devices 100 are ready to match with the user designated digital device make and model.

A digital device protective artwork case 162 is produced after the mold casting. The digital device protective artwork case 162 is further processed in manufacture. The digital device protective artwork case website and processing center 130 communicates with the website processor, which converts the user artwork design into a seamless wraparound pattern 170. This is where user selected stock artwork is applied on the digital device protective artwork case to complete order manufacture 172. The end product of the manufacturing is a digital device protective artwork case with an applied stock artwork design 180. A user's order is then shipped to the user of one embodiment.

The digital device protective artwork case is fashionable and can include a tempered glass feature on the front face of the digital device with electronically stitched artwork design that wraps the digital device completely with a seamless design. The digital device protective artwork case can include a front face made of a clear film or a film with an applied electronically stitched artwork design and including a front face insert including printed film and plastic front face inserts. The digital device protective artwork case can include a coordinating artwork design electronically stitched downloadable image for usages including a home screen and screen saver. The electronically stitched downloadable image seamlessly integrates with the front face of the digital device protective artwork case. The electronically stitched artwork design seamlessly transitions on all of the sides of the digital device protective artwork case making the appearance of a single and complete image that flows around the digital device protective artwork case. The downloadable image is electronically stitched to the visible artwork design image of the case, including the sides, top; bottom the digital device protective artwork case.

The electronically stitched downloadable image can be provided to the user by any electronic means, such as a barcode on the retail packaging, a URL link, via an email message, via a text message or the like. This unique bundle completely changes and transforms the digital device to include case features including a thermoplastic polyurethane (TPU) shock absorbing core, supported by a hard outer shell and tempered glass front face. The resulting digital device protective artwork case is a high-end, extremely durable protection with a fashionable outlook.

DETAILED DESCRIPTION

Figure 2:
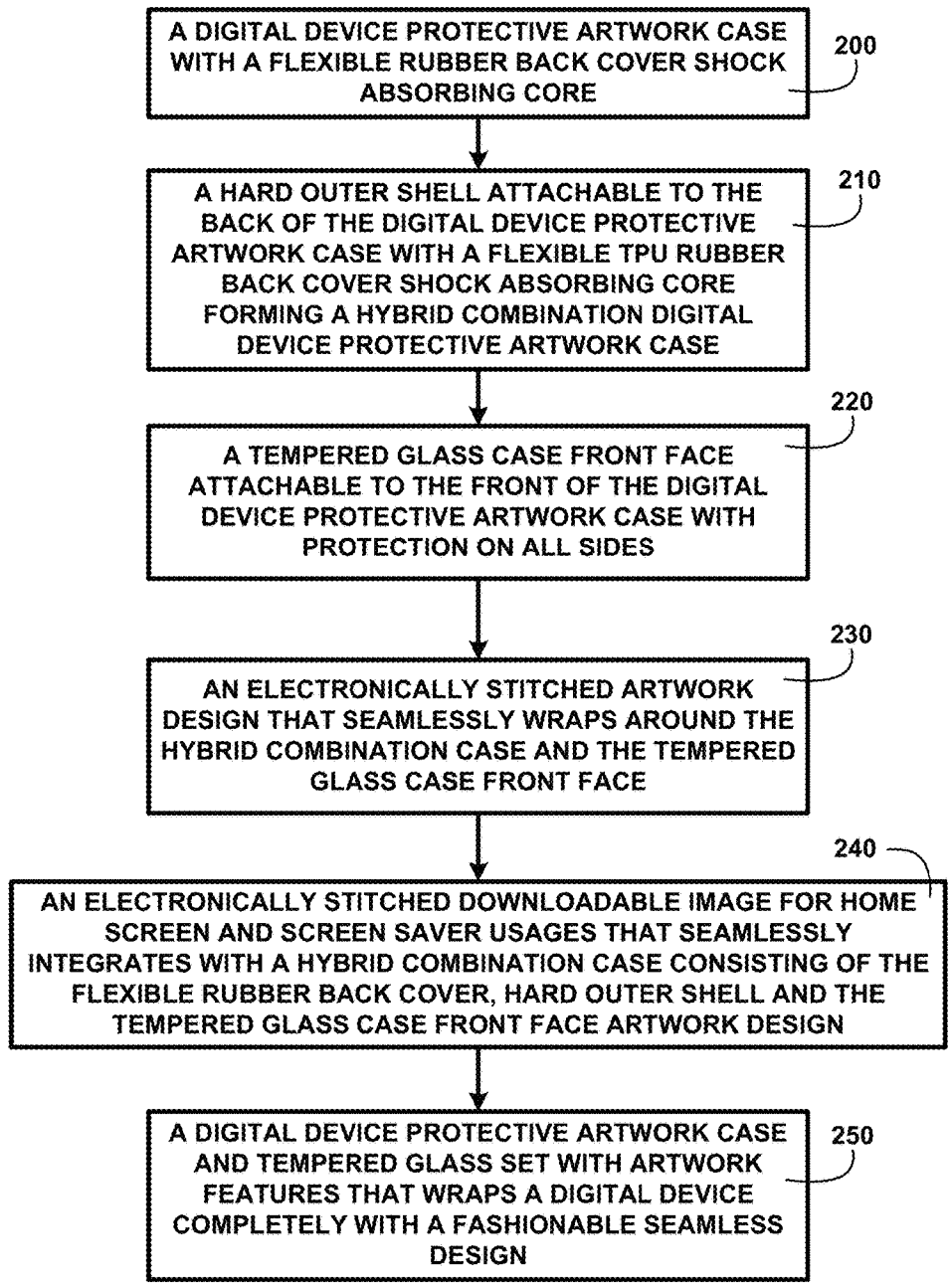
FIG. 2 shows a block diagram of an overview of a digital device protective artwork case method and devices of one embodiment.

FIG. 2 shows a block diagram of an overview of digital device protective artwork case method and devices of one embodiment. FIG. 2 shows a digital device protective artwork case with a Flexible Rubber Back Cover shock absorbing core with a flexible rubber back cover shock absorbing core 200. A hard outer shell attachable to the back of the digital device protective artwork case with a flexible TPU rubber back cover shock absorbing core forming a hybrid combination digital device protective artwork case 210. A tempered glass case front face attachable to the front of the digital device protective artwork case with protection on all sides 220.

Figure 3:
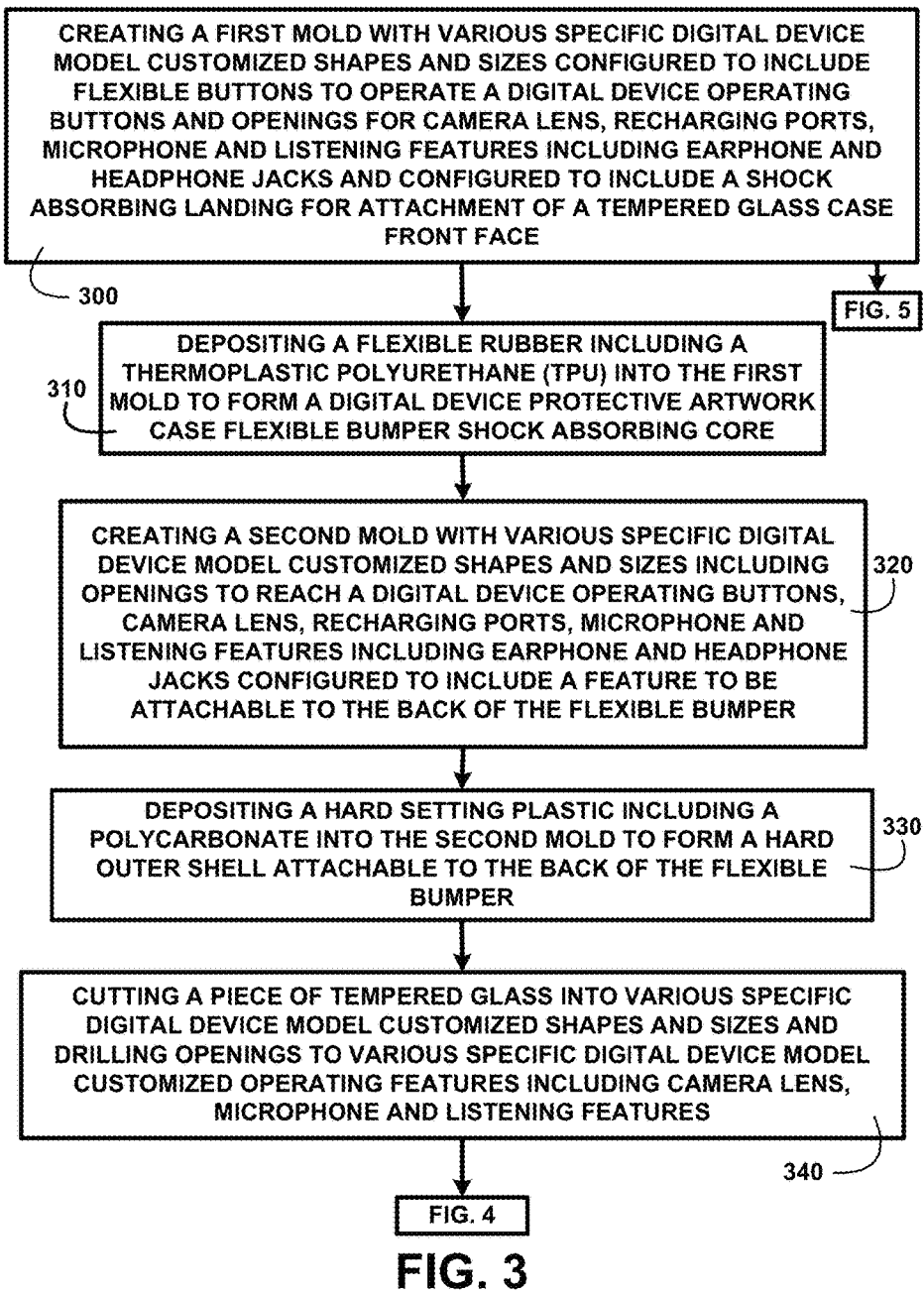
FIG. 3 shows a block diagram of an overview flow chart of a digital device protective artwork case method and devices of one embodiment.

An electronically stitched artwork design that seamlessly wraps around the hybrid combination case and the tempered glass case front face 230. An electronically stitched downloadable image for home screen and screen saver usages that seamlessly integrates with a hybrid combination case consisting of the flexible rubber back cover, hard outer shell and the tempered glass case front face artwork design 240. A digital device protective artwork case and tempered glass set with artwork feature that wraps a digital device completely with a fashionable seamless design 250 of one embodiment.
Digital Device Protective Artwork Case Method and Devices:

FIG. 3 shows a block diagram of an overview flow chart of a digital device protective artwork case method and devices of one embodiment. FIG. 3 shows creating a first mold with various specific digital device model customized shapes and sizes configured to include flexible buttons to operate a digital device operating buttons and openings for camera lens, recharging ports, microphone and listening features including earphone and headphone jacks and configured to include a shock absorbing landing for attachment of a tempered glass case front face 300. The description continues on FIG. 5.

Depositing a Flexible Rubber including thermoplastic polyurethane (TPU) into the first mold to form a digital device protective ARTWORK case flexible bumper shock absorbing core 310. Creating a second mold with various specific digital device model customized shapes and sizes including openings to reach a digital device operating buttons, camera lens, recharging ports, microphone and listening features including earphone and headphone jacks configured to include a feature to be attachable to the back of the flexible bumper 320. Depositing a hard setting plastic including a polycarbonate into the second mold to form a hard outer shell attachable to the back of the flexible bumper 330 of one embodiment.

Figure 4:
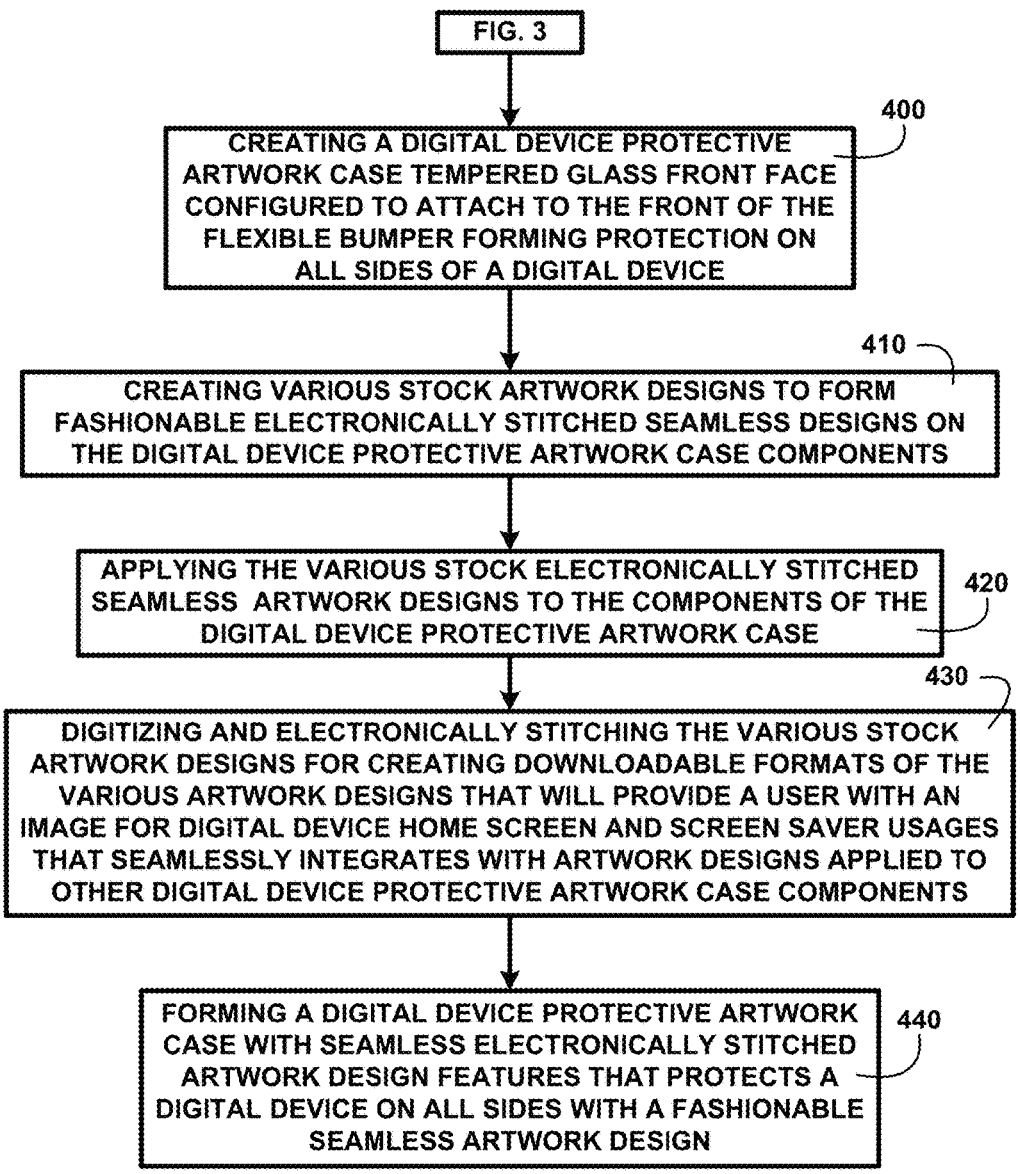
FIG. 4 shows a block diagram of an overview flow chart of artwork designs processing of one embodiment.

Cutting a piece of tempered glass into various specific digital device model customized shapes and sizes and drilling openings to various specific digital device model customized operating features including camera lens, microphone and listening features 340 of one embodiment. The description continues on FIG. 4.
Artwork Designs Processing:

FIG. 4 shows a block diagram of an overview flow chart of artwork designs processing of one embodiment. FIG. 4 shows a continuation from FIG. 3 including creating a digital device protective artwork case tempered glass front face configured to attach to the front of the flexible bumper forming protection on all sides of a digital device 400.

Figure 5:
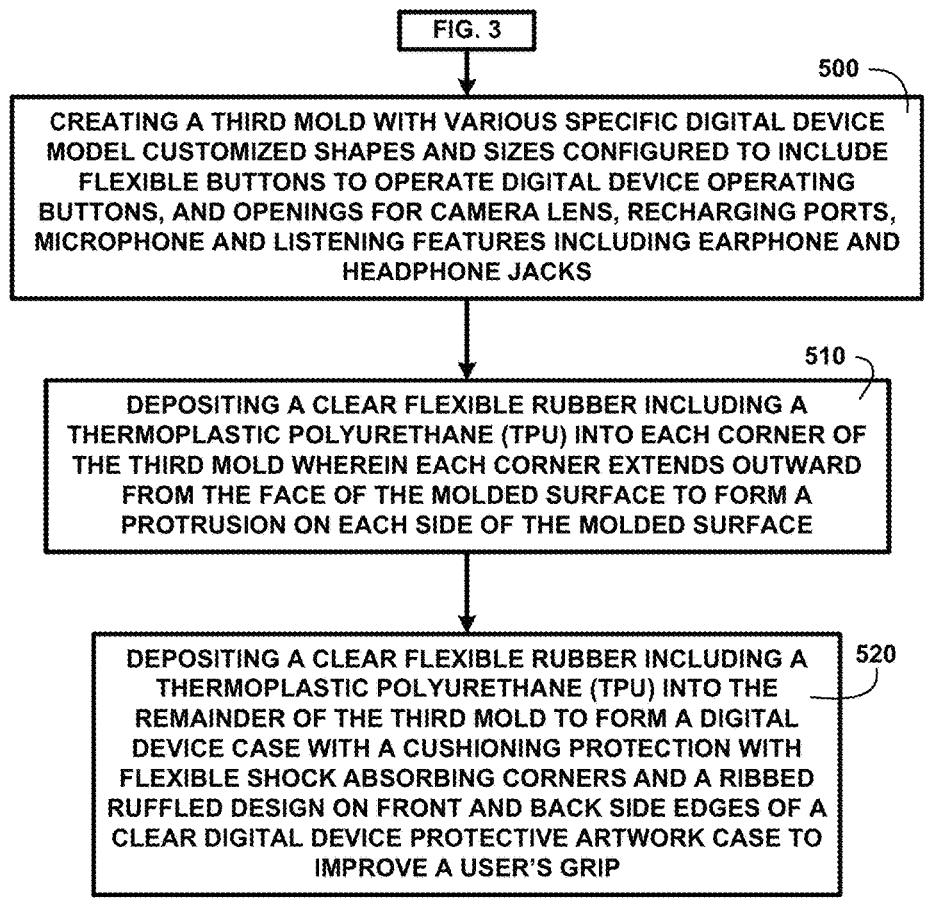
FIG. 5 shows a block diagram of an overview flow chart of a third mold of one embodiment.

Creating various stock artwork designs to form fashionable electronically stitched seamless designs on the digital device protective artwork case components 410 and applying the various stock electronically stitched seamless artwork designs to the components of the digital device protective artwork case 420. Digitizing and electronically stitching the various stock artwork designs for creating downloadable formats including tablets and cell phones including PC, Mac, android, iPhone and other format compatibilities of the various artwork designs that will provide a user with an image for digital device home screen and screen saver usages that seamlessly integrates with artwork designs applied to other digital device protective artwork case components 430. Forming a digital device protective artwork case with seamless electronically stitched artwork design features that protects a digital device on all sides with a fashionable seamless artwork design 440 of one embodiment.
Third Mold:

FIG. 5 shows a block diagram of an overview flow chart of a third mold of one embodiment. FIG. 5 shows a continuation from FIG. 3 with creating a third mold with various specific digital device model customized shapes and sizes configured to include flexible buttons to operate digital device operating buttons, and openings for camera lens, recharging ports, microphone and listening features including earphone and headphone jacks 500. Depositing a clear flexible rubber including thermoplastic polyurethane (TPU) into each corner of the third mold wherein each corner extends outward from the face of the molded surface to form a protrusion on each side of the molded surface 510. Depositing a clear flexible rubber including a thermoplastic polyurethane (TPU) into the remainder of the third mold to form a digital device case with a cushioning protection with flexible shock absorbing corners and a ribbed ruffled design on front and back side edges of a clear digital device protective artwork case to improve a user's grip 520 of one embodiment.
Digital Device Protective Artwork Case Flexible Bumper:

FIG. 6A shows for illustrative purposes only an example of digital device protective artwork case flexible bumper of one embodiment. FIG. 6A shows a digital device protective artwork case flexible bumper 600 that provide protection to the corners and edges of a digital device. Flexible buttons 610 allow a user to operate the buttons on the digital device with the digital device protective artwork case flexible bumper placed on the device of one embodiment.
Digital Device Protective Artwork Case Flexible Bumper and Back:

FIG. 6B shows for illustrative purposes only an example of digital device protective artwork case flexible bumper and back of one embodiment. FIG. 6B shows the digital device protective artwork case flexible bumper 600 with flexible buttons 610. A digital device protective artwork case flexible bumper back 620 is attached to the digital device protective artwork case flexible bumper 600. A large opening can be seen on the digital device protective artwork case flexible bumper back 620 and can be for example for a digital device camera clear view towards the back of one embodiment.
Digital Device Protective Artwork Case Flexible Bumper and Back Rear View:

FIG. 6C shows for illustrative purposes only an example of digital device protective artwork case flexible bumper and back rear view of one embodiment. FIG. 6C shows the digital device protective artwork case flexible bumper 600 including the flexible buttons 610. A digital device protective artwork case flexible bumper back rear view 630 clearly shows the large opening that can be for example for a digital device camera clear view towards the back of one embodiment.

Digital Device Protective Artwork Case Flexible Bumper and Back Front View:

FIG. 6D shows for illustrative purposes only an example of digital device protective artwork case flexible bumper and back front view of one embodiment. FIG. 6D shows the digital device protective artwork case flexible bumper 600 and flexible buttons 610. Also shown is a flexible bumper front tempered glass attachment ledge 640, shown in greater detail in FIG. 6E with an enlargement of detail "6D" 650 of one embodiment.

Flexible Bumper Front Tempered Glass Attachment Ledge Detail:

FIG. 6E shows for illustrative purposes only an example of flexible bumper front tempered glass attachment ledge detail of one embodiment. FIG. 6E shows detail "6D" 650 showing a corner section of the digital device protective artwork case flexible bumper 600 and the flexible bumper front tempered glass attachment ledge 640 of one embodiment.

Digital Device Protective Artwork Case Hard Outer Shell Prospective View:

FIG. 7A shows for illustrative purposes only an example of a digital device protective artwork case hard outer shell prospective view of one embodiment. FIG. 7A shows a digital device protective artwork case hard outer shell 700 in perspective view and cutouts for flexible buttons 610 of FIG. 6A on the flexible bumper 600 of FIG. 6A. Also shown is the large opening to match the size and position of the large opening on the flexible back 620 of FIG. 6B of one embodiment.

Digital Device Protective Artwork Case Hard Outer Shell Rear View:

FIG. 7B shows for illustrative purposes only an example of a digital device protective artwork case hard outer shell rear view of one embodiment. FIG. 7B shows a digital device protective artwork case hard outer shell rear view 710 and cutouts for flexible buttons 610 of FIG. 6A on the flexible bumper 600 of FIG. 6A. Also shown is the large opening to match the size and position of the large opening on the flexible back 620 of FIG. 6B of one embodiment.

Digital Device Protective Artwork Case Hard Outer Shell Front View:

FIG. 7C shows for illustrative purposes only an example of a digital device protective artwork case hard outer shell front view of one embodiment. FIG. 7C shows digital device protective artwork case hard outer shell front view 720 and cutouts for flexible buttons 610 of FIG. 6A on the flexible bumper 600 of FIG. 6A. Also shown is the large opening to match the size and position of the large opening on the flexible back 620 of FIG. 6B of one embodiment.

Tempered Glass Front Face:

FIG. 7D shows for illustrative purposes only an example of a tempered glass front face of one embodiment. FIG. 7D shows a tempered glass front face 730 and cutouts to access a digital device features including buttons, home button, speaker and microphone of one embodiment.

Figure 8A:
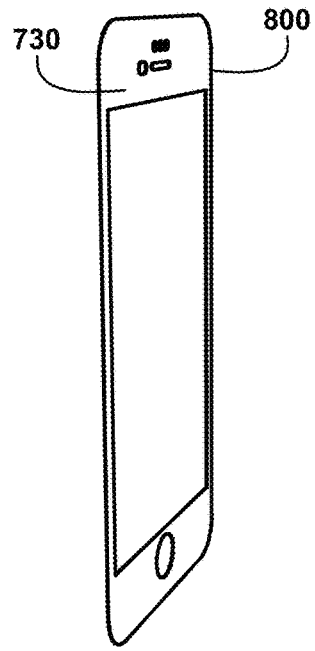
FIG. 8A shows for illustrative purposes only an example of a tempered glass front face in a perspective view of one embodiment.

Tempered Glass Front Face in a Perspective View:

FIG. 8A shows for illustrative purposes only an example of a tempered glass front face in a perspective view of one embodiment. FIG. 8A shows a tempered glass front face 730 in a perspective view 800 showing the cutouts to access digital device features including buttons, home button, speaker and microphone of one embodiment.

Figure 8B:
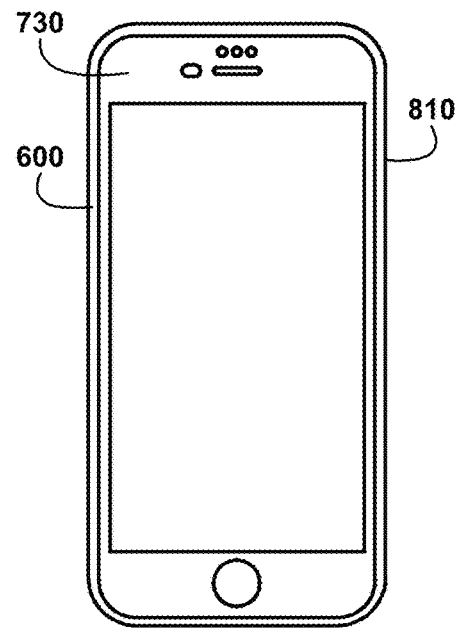
FIG. 8B shows for illustrative purposes only an example of a digital device with the digital device protective artwork case attached front view of one embodiment.

A Digital Device with the Digital Device Protective Artwork Case Attached Front View:

FIG. 8B shows for illustrative purposes only an example of a digital device with the digital device protective artwork case attached front view of one embodiment. FIG. 8B shows a digital device with the digital device protective artwork case attached front view 810 showing the tempered glass front face 730 and the edges of the flexible bumper 600.

Figure 8C:
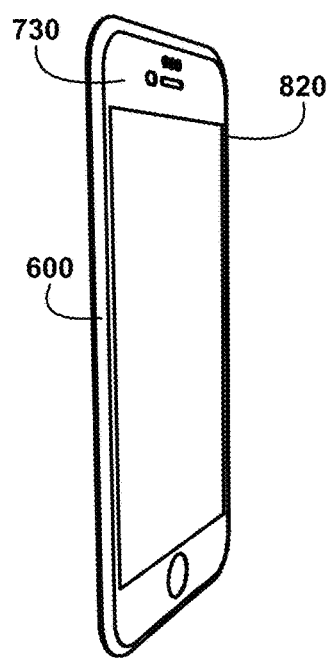
FIG. 8C shows for illustrative purposes only an example of a digital device with the digital device protective artwork case attached prospective view of one embodiment.

A Digital Device with the Digital Device Protective Artwork Case Attached Prospective View:

FIG. 8C shows for illustrative purposes only an example of a digital device with the digital device protective artwork case attached prospective view of one embodiment. FIG. 8C shows a digital device with the digital device protective artwork case attached prospective view 820 illustrating the slim fit of the digital device protective artwork case with the tempered glass front face 730 and the flexible bumper 600 of one embodiment.

Figure 9A:
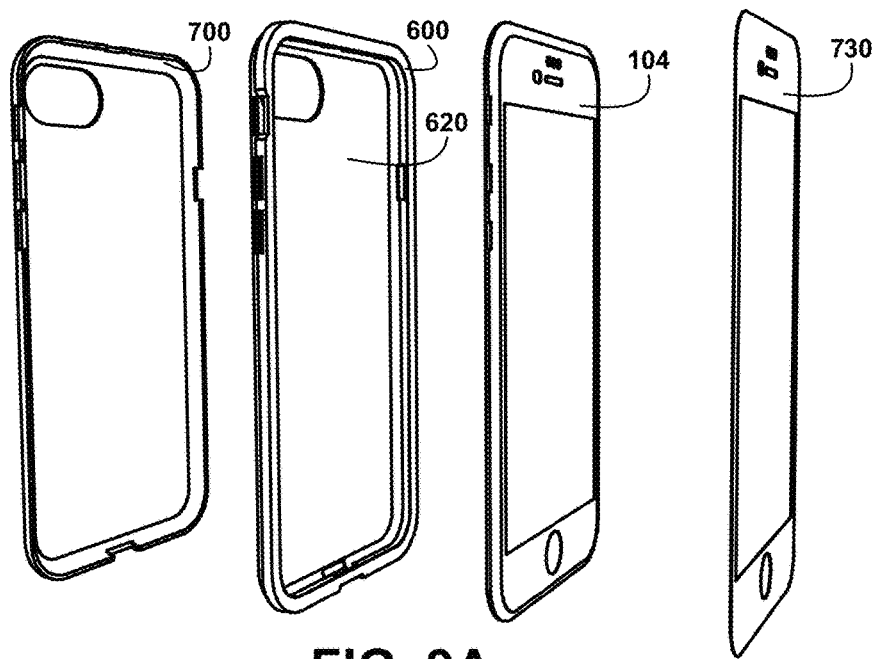
FIG. 9A shows for illustrative purposes only an example of digital device protective artwork case components and a digital device of one embodiment.

Digital Device Protective Artwork Case Components and a Digital Device:

FIG. 9A shows for illustrative purposes only an example of a digital device protective artwork case components and a digital device of one embodiment. FIG. 9A shows digital device protective artwork case components including the digital device protective artwork case hard outer shell 700, the flexible bumper 600 with the flexible back 620 cover shock absorbing core and the tempered glass front face 730. Also show is an example of user digital devices 100 of FIG. 1, a cell phone 104 of one embodiment.

Figure 9B:
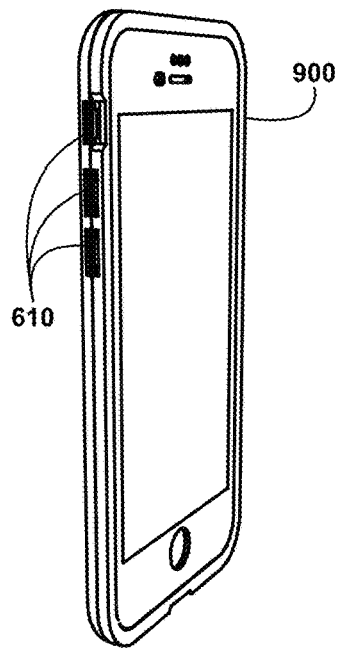
FIG. 9B shows for illustrative purposes only an example of digital device protective artwork case components and a digital device assembled of one embodiment.

Digital Device Protective Artwork Case Components and a Digital Device Assembled:

FIG. 9B shows for illustrative purposes only an example of a digital device protective artwork case components and a digital device assembled of one embodiment. FIG. 9B shows a digital device protective artwork case attached on all sides of a digital device 900 of one embodiment.

Figure 9C:
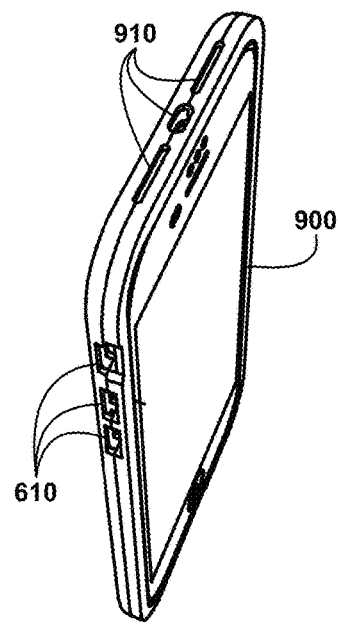
FIG. 9C shows for illustrative purposes only an example of a digital device protective artwork case top perspective view of one embodiment.

Digital Device Protective Artwork Case Top Perspective View:

FIG. 9C shows for illustrative purposes only an example of a digital device protective artwork case top perspective view of one embodiment. FIG. 9C shows a digital device protective artwork case attached on all sides of a digital device 900 in a top perspective view. The flexible buttons 610 and cell phone top openings 910 are visible from this view of one embodiment.

Figure 10A:
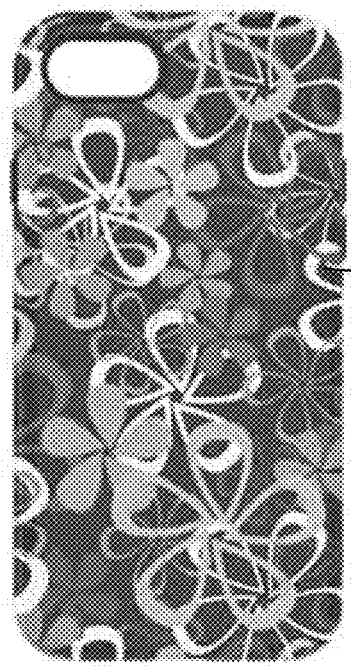
FIG. 10A shows for illustrative purposes only an example of a hard shell flower pattern stock artwork design of one embodiment.

Hard Shell Flower Pattern Stock Artwork Design:

FIG. 10A shows for illustrative purposes only an example of a hard shell flower pattern stock artwork design of one embodiment. FIG. 10A shows a hard shell flower pattern stock artwork design 1000 of one embodiment.

Figure 10B:
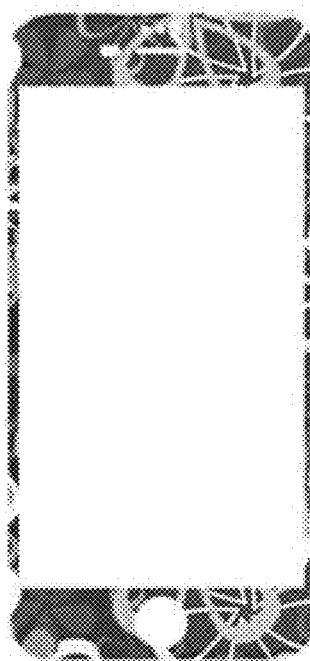
FIG. 10B shows for illustrative purposes only an example of a tempered glass front face with flower pattern stock artwork design of one embodiment.

Tempered Glass Front Face with Flower Pattern Stock Artwork Design:

FIG. 10B shows for illustrative purposes only an example of a tempered glass front face with flower pattern stock artwork design of one embodiment. FIG. 10B shows tempered glass front face with flower pattern stock artwork design 1010 of one embodiment.

Figure 10C:
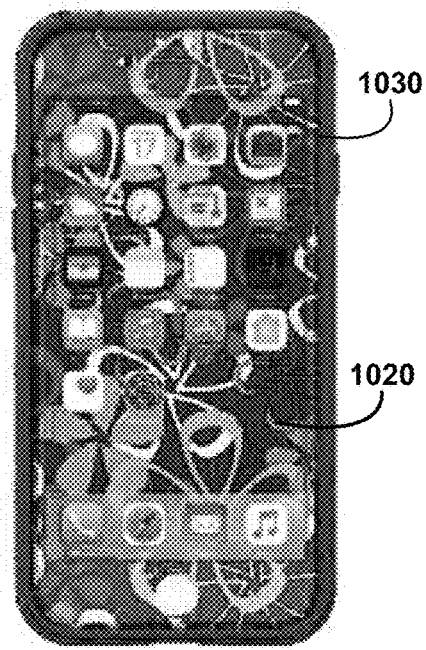
FIG. 10C shows for illustrative purposes only an example of a downloadable image flower pattern stock artwork design of one embodiment.

Downloadable Image Flower Pattern Stock Artwork Design:

FIG. 10C shows for illustrative purposes only an example of a downloadable image flower pattern stock artwork design of one embodiment. FIG. 10C shows downloadable image flower pattern stock artwork design 1020 and the digital device protective artwork case bumper edges 1030 of one embodiment.

Figure 11A:
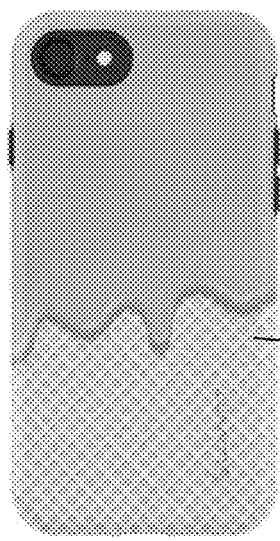
FIG. 11A shows for illustrative purposes only an example of a hard shell ice cream cone pattern stock artwork design of one embodiment.

Hard Shell Ice Cream Cone Pattern Stock Artwork Design:

FIG. 11A shows for illustrative purposes only an example of a hard shell ice cream cone pattern stock artwork design of one embodiment. FIG. 11A shows a hard shell ice cream cone pattern stock artwork design 1100 of one embodiment.

Figure 11B:
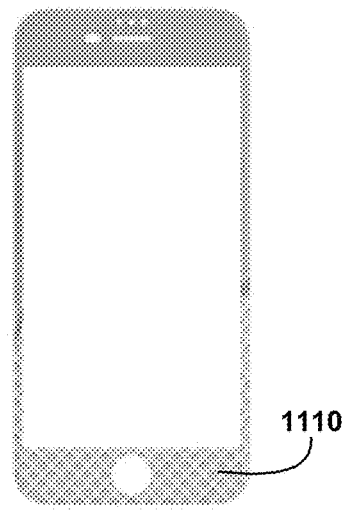
FIG. 11B shows for illustrative purposes only an example of a tempered glass front face with ice cream cone pattern stock artwork design of one embodiment.

Tempered Glass Front Face with Ice Cream Cone Pattern Stock Artwork Design:

FIG. 11B shows for illustrative purposes only an example of a tempered glass front face with ice cream cone pattern stock artwork design of one embodiment. FIG. 11B shows tempered glass front face with ice cream cone pattern stock artwork design 1110 of one embodiment.

Figure 11C:
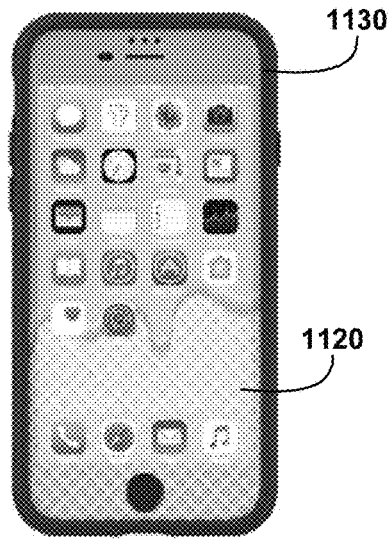
FIG. 11C shows for illustrative purposes only an example of a downloadable image ice cream cone pattern stock artwork design of one embodiment.

Downloadable Image Ice Cream Cone Pattern Stock Artwork Design:

FIG. 11C shows for illustrative purposes only an example of a downloadable image ice cream cone pattern stock artwork design of one embodiment. FIG. 11C shows a downloadable image ice cream cone pattern stock artwork design 1120 and bumper edges 1130 of one embodiment.

Figure 12A:
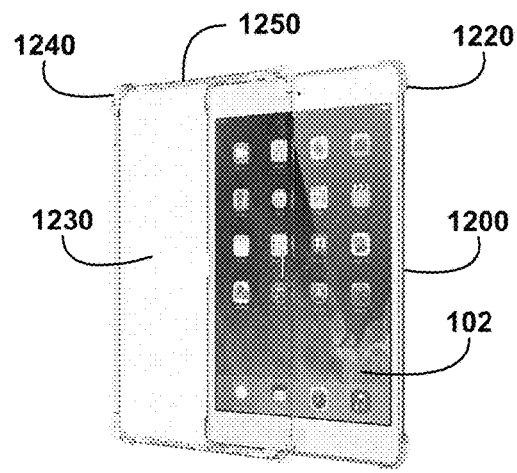
FIG. 12A shows for illustrative purposes only an example of a tablet clear flexible rubber digital device protective artwork case of one embodiment.

Tablet Clear Flexible Rubber Digital Device Protective Artwork Case:

FIG. 12A shows for illustrative purposes only an example of a tablet clear flexible rubber digital device protective artwork case of one embodiment. FIG. 12A shows a tablet clear flexible rubber digital device protective artwork case front case 1230 being assembled on a user digital device 100 of FIG. 1 for example a tablet 102. Shown are the raised protruding front case bumper corners 1240 and ribbed ruffled design hand grip 1250. Also showing are raised protruding back case bumper corners 1220 and back case edge with ribbed ruffled design hand grip 1200 of one embodiment.

Figure 12B:
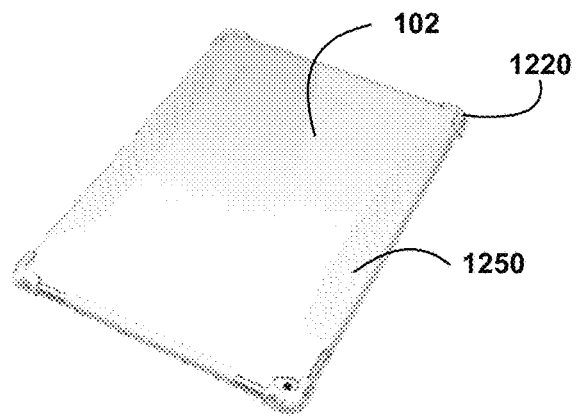
FIG. 12B shows for illustrative purposes only an example of a tablet clear flexible rubber digital device protective artwork case back view of one embodiment.

Tablet Clear Flexible Rubber Digital Device Protective Artwork Case Back View:

FIG. 12B shows for illustrative purposes only an example of a tablet clear flexible rubber digital device protective artwork case back view of one embodiment. FIG. 12B shows a tablet clear flexible rubber digital device protective artwork case back view including the tablet 102, raised protruding back case bumper corners 1220, and ribbed ruffled design hand grip 1250 of one embodiment.

Figure 12C:
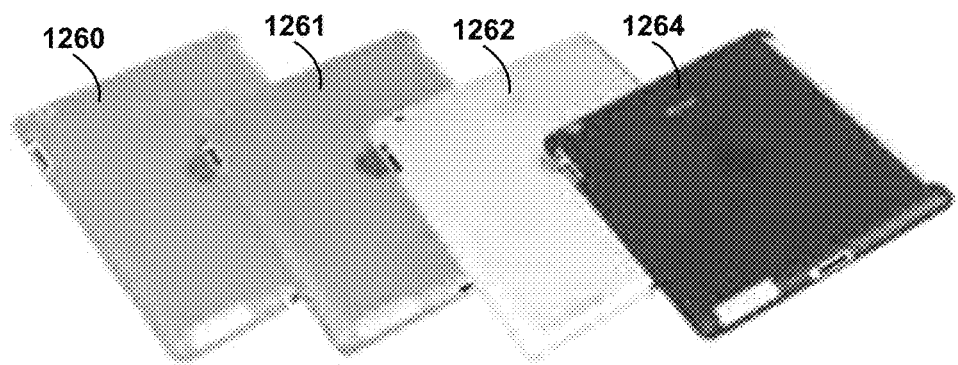
FIG. 12C shows for illustrative purposes only an example of a tablet clear flexible rubber digital device protective artwork case shows tablet color of one embodiment.

Tablet Clear Flexible Rubber Digital Device Protective Artwork Case Shows Tablet Color:

FIG. 12C shows for illustrative purposes only an example of a tablet clear flexible rubber digital device protective artwork case shows tablet color of one embodiment. FIG. 12C shows a tablet clear flexible rubber digital device protective artwork case shows tablet color through the clear digital device protective artwork case material. A clear flexible rubber digital device protective artwork case shows pink tablet color 1260, a clear flexible rubber digital device protective artwork case shows blue tablet color 1261, a clear flexible rubber digital device protective artwork case shows silver tablet color 1262, and a clear flexible rubber digital device protective artwork case shows charcoal tablet color 1264 of one embodiment.

Figure 13A:
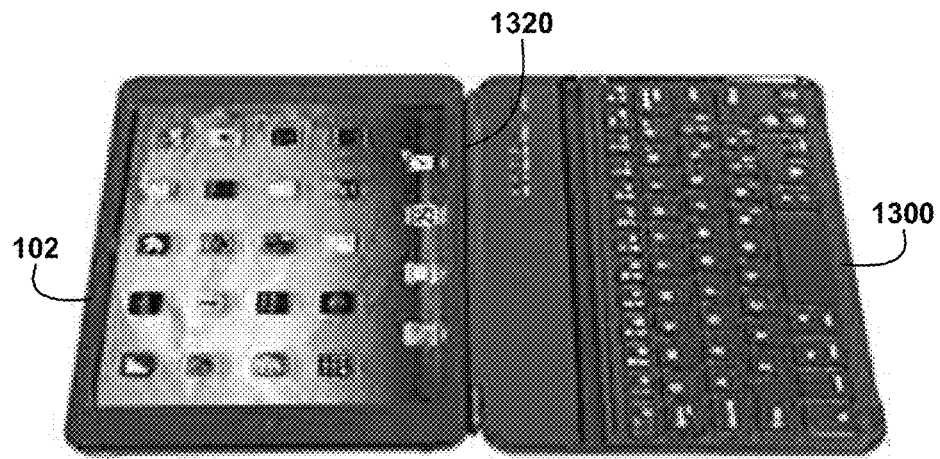
FIG. 13A shows for illustrative purposes only an example of a backlit ultrathin keyboard cover flat position of one embodiment.
Figure 13B:
FIG. 13B shows for illustrative purposes only an example of a backlit ultrathin keyboard cover tablet stand position of one embodiment.

Backlit Ultrathin Keyboard Cover Flat Position:

FIG. 13A shows for illustrative purposes only an example of a backlit ultrathin keyboard cover flat position of one embodiment. FIG. 13A shows a backlit ultrathin keyboard cover flat position coupled to the tablet 102. The backlit ultrathin keyboard cover 1300 is a digital device protective artwork case that protects the screen of the tablet 102. The backlit ultrathin keyboard cover 1300 is coupled to the tablet 102 using a magnetic spine 1320 that latches to the side of the tablet 102 and is strong enough to support the full weight of the tablet, even as it swings in mid-air of one embodiment Backlit Ultrathin Keyboard Cover Tablet Stand Position:

FIG. 13B shows for illustrative purposes only an example of a backlit ultrathin keyboard cover tablet stand position of one embodiment. FIG. 13B shows a backlit ultrathin keyboard cover tablet stand position. The tablet 102 is coupled to the backlit ultrathin keyboard cover 1300 using a magnetic spine 1320. When the user wants to begin typing, the tablet 102 can rest, at a fixed angle, in either landscape or portrait mode in a slot above the keyboard of one embodiment.

Figure 14:
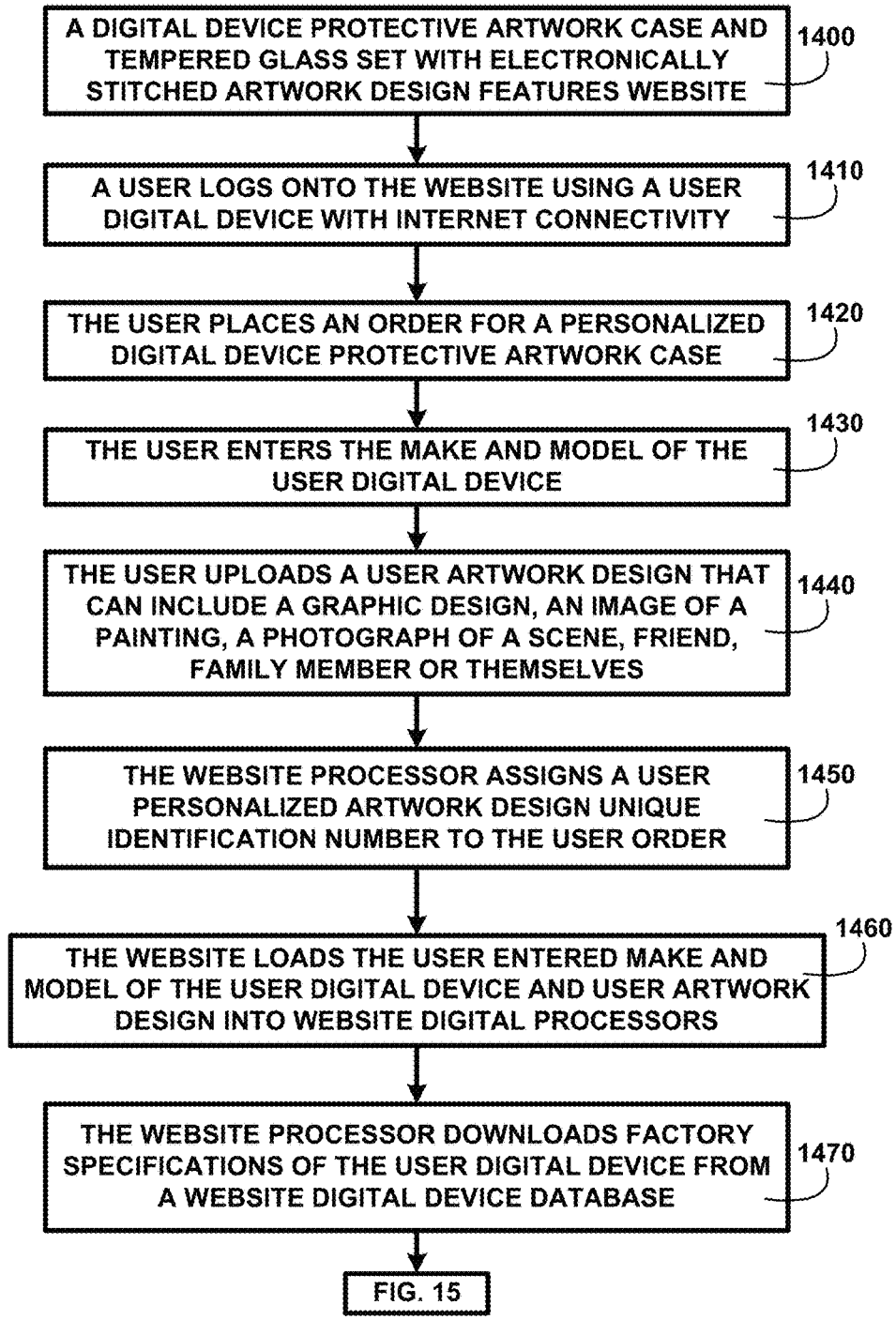
FIG. 14 shows a block diagram of an overview of a personalized user artwork design of one embodiment.

Personalized User Artwork Design:

FIG. 14 shows a block diagram of an overview of a personalized user artwork design of one embodiment. FIG. 14 shows a digital device protective artwork case and tempered glass set with electronically stitched artwork design features website 1400. A user logs onto the website using a user digital device with internet connectivity 1410. The user places an order for a personalized digital device protective artwork case 1420. The user enters the make and model of the user digital device 1430. The user uploads a user artwork design that can include a graphic design, an image of a painting, and a photograph of a scene, friend, family member or themselves 1440. The website processor assigns a user personalized artwork design unique identification number to the user order 1450. The website loads the user entered make and model of the user digital device and user artwork design into website digital processors 1460. The website processor downloads factory specifications of the user digital device from a website digital device database 1470 of one embodiment. The description continues on FIG. 15.

Figure 15:
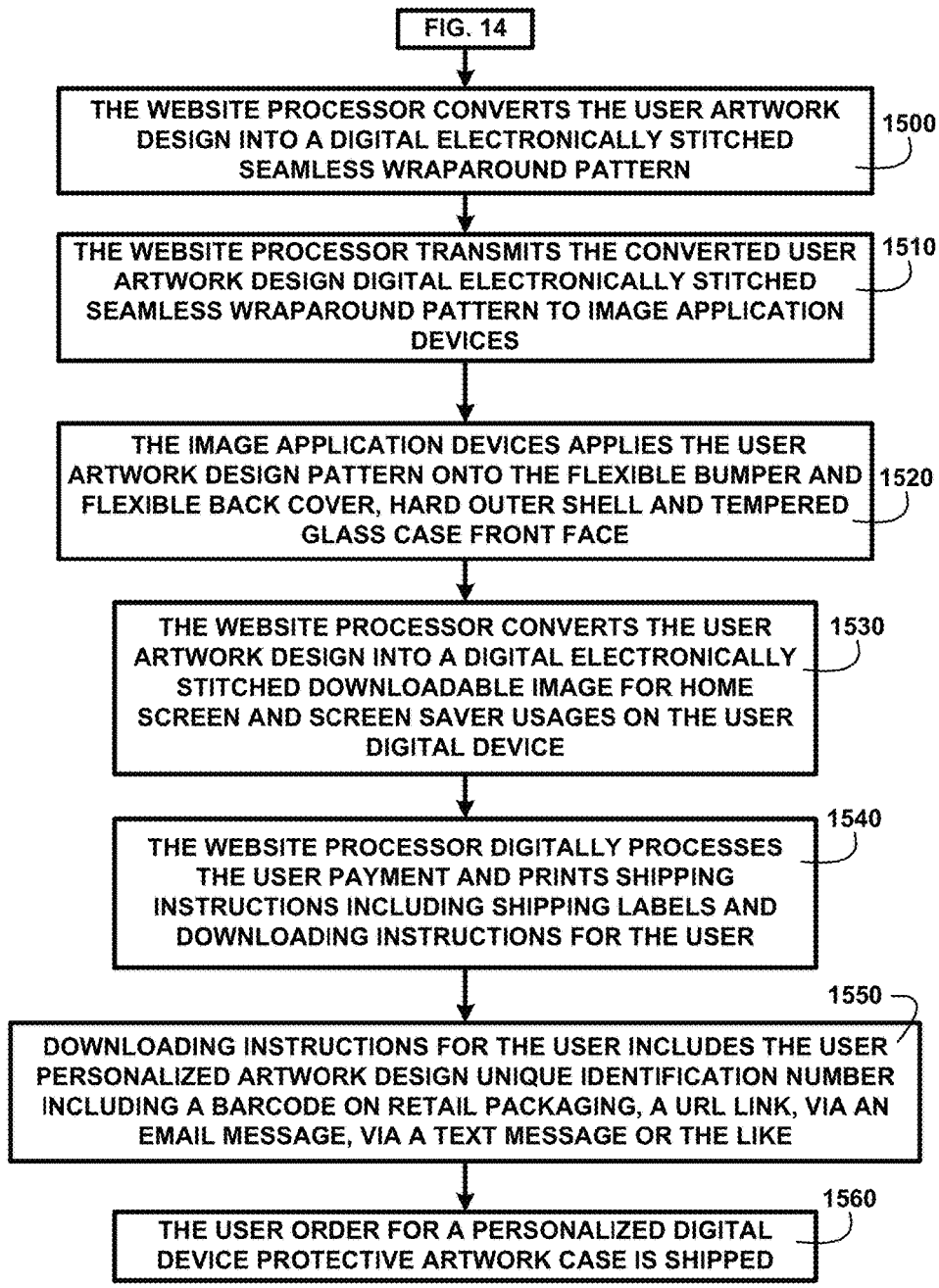
FIG. 15 shows a block diagram of an overview of a converted user artwork design of one embodiment.

Converted User Artwork Design:

FIG. 15 shows a block diagram of an overview of a converted user artwork design of one embodiment. FIG. 15 shows a continuation from FIG. 14 where the website processor converts the user artwork design into a digital electronically stitched seamless wraparound pattern 1500. The website processor transmits the converted user artwork design digital electronically stitched seamless wraparound pattern to image application devices 1510. The image application devices applies the user artwork design pattern onto the flexible bumper and flexible back cover, hard outer shell and tempered glass case front face 1520. The website processor converts the user artwork design into a digital electronically stitched downloadable image for home screen and screen saver usages on the user digital device 1530. The website processor digitally processes the user payment and prints shipping instructions including shipping labels and downloading instructions for the user 1540. Downloading instructions for the user includes the user personalized artwork design unique identification number including a barcode on retail packaging, a URL link, via an email message, via a text message or the like 1550. The user order for a personalized digital device protective artwork case is shipped 1560 of one embodiment.

Figure 16:
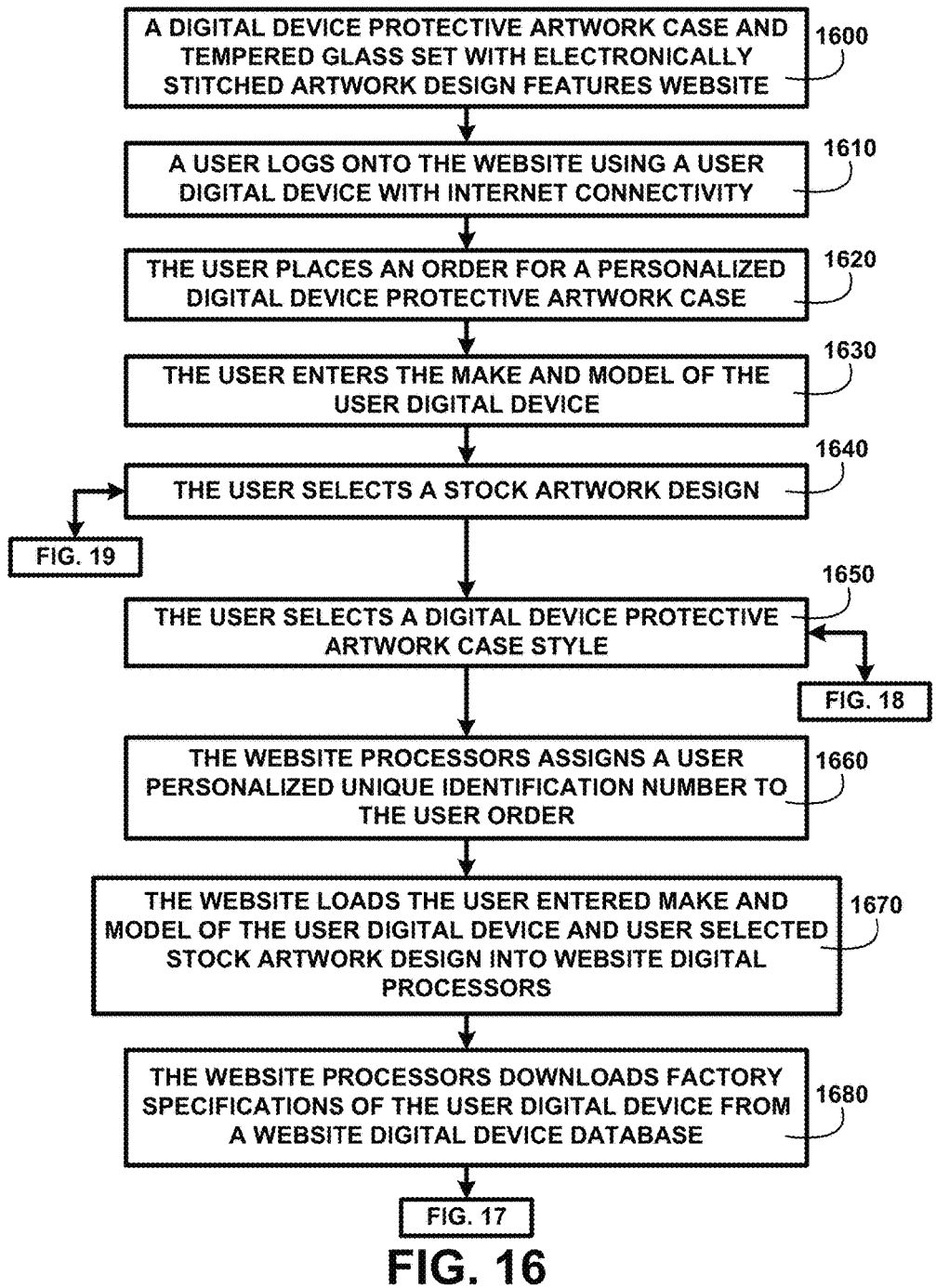
FIG. 16 shows a block diagram of an overview of a user selected stock artwork design and digital device protective artwork case style of one embodiment.

User Selected Stock Artwork Design and Digital Device Protective Artwork Case Style:

FIG. 16 shows a block diagram of an overview of a user selected stock artwork design and digital device protective artwork case style of one embodiment. FIG. 16 shows a digital device protective artwork case and tempered glass set with electronically stitched artwork design features website 1600. A user logs onto the website using a user digital device with internet connectivity 1610. The user places an order for a personalized digital device protective artwork case 1620. The user enters the make and model of the user digital device 1630. The user selects a stock artwork design 1640 from those shown in FIG. 19. The user selects a digital device protective artwork case style 1650 from those shown in FIG. 18. The website processor assigns a user personalized unique identification number to the user order 1660. The website loads the user entered make and model of the user digital device and user selected stock artwork design into website digital processors 1670. The website processor downloads factory specifications of the user digital device from a website digital device database 1680 of one embodiment. The description continues on FIG. 17.

Figure 17:
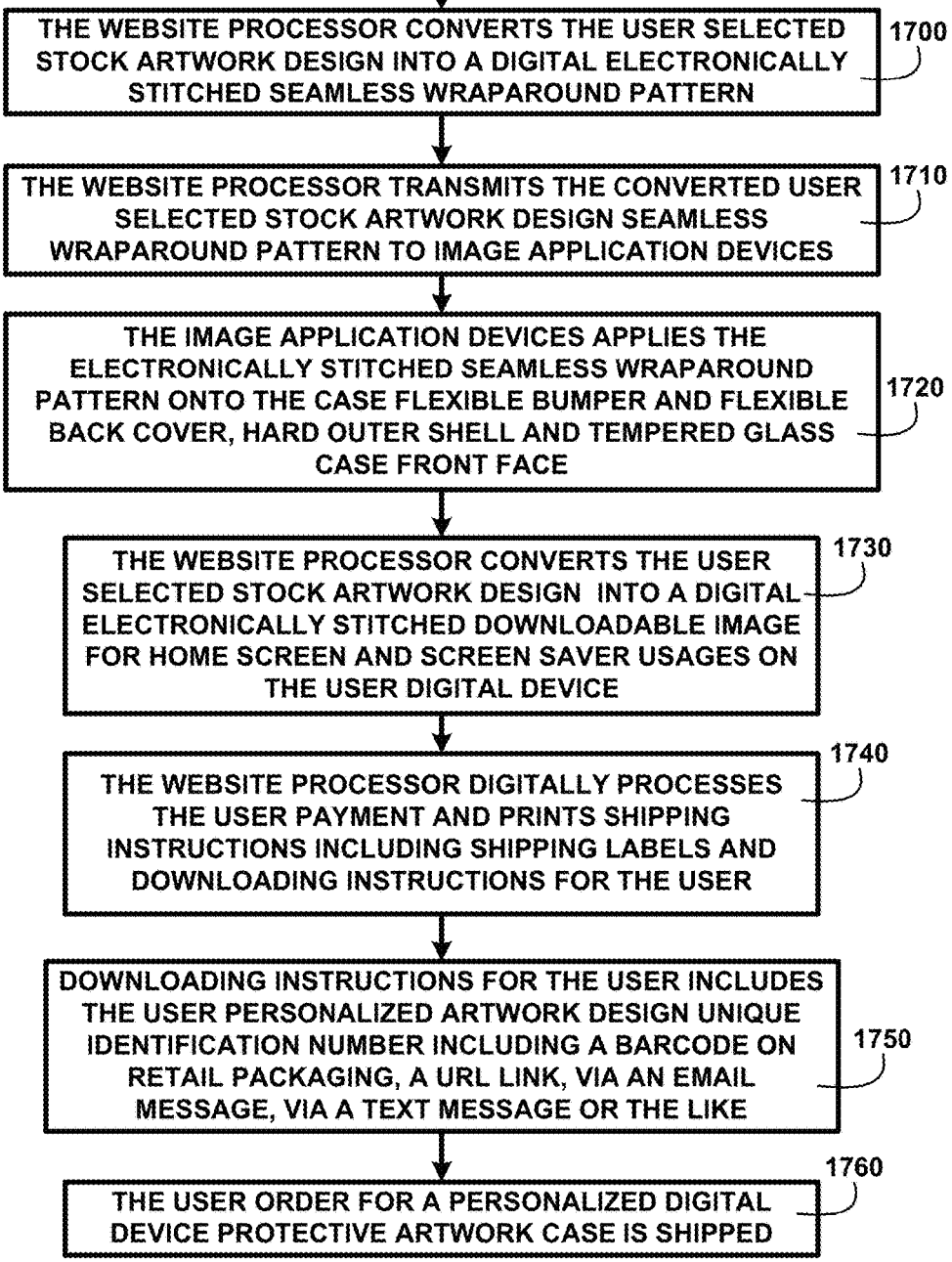
FIG. 17 shows a block diagram of an overview of a user artwork design downloadable image of one embodiment.

User Artwork Design Downloadable Image:

FIG. 17 shows a block diagram of an overview of a user artwork design downloadable image of one embodiment. FIG. 17 shows a continuation from FIG. 16 including the website processor converts the user selected stock artwork design into a digital electronically stitched seamless wraparound pattern 1700. The website processor transmits the converted user selected stock artwork design seamless wraparound pattern to image application devices 1710. The image application devices applies the electronically stitched seamless wraparound pattern onto the case flexible bumper and flexible back cover, hard outer shell and tempered glass case front face 1720. The website processor converts the user selected stock artwork design into a digital electronically stitched downloadable image for home screen and screen saver usages on the user digital device 1730. The website processor digitally processes the user payment and prints shipping instructions including shipping labels and downloading instructions for the user 1740. Downloading instructions for the user includes the user personalized artwork design unique identification number including a barcode on retail packaging, a URL link, via an email message, via a text message or the like 1750. The user order for a personalized digital device protective artwork case is shipped 1760 of one embodiment.

Digital Device Protective Artwork Case Styles:

FIG. 18 shows a block diagram of an overview of digital device protective artwork case styles of one embodiment. FIG. 18 shows a continuation from FIG. 16 including digital device protective artwork case styles 1800 from which a user selects. The digital device protective artwork case styles 1800 includes a single layer soft or hard shell case 1810, a bumper with tempered glass on both sides 1811, a printed artwork front face film 1812, custom print artwork glass+ stock print artwork case 1813, stock glass+custom print artwork case 1814, custom glass+custom case 1815, stock case+stock glass 1816, stock case+clear glass 1817, stock case+no glass 1818, screen saver with more images that will match the tempered glass 1819, bumper case with tempered glass back 1820, bumper case with printed artwork tempered glass back 1821, tempered glass back that sticks to a digital device with a bumper around 1822, printed flexible bumper and flexible back 1823, printed artwork tempered glass back that sticks to a digital device with a bumper around 1824, clear tempered glass back and front that sticks to a digital device with a bumper around 1825, printed artwork tempered glass back and front that sticks to a digital device with a bumper around 1826, printed flexible bumper, tempered glass stuck to flexible back 1827, stock case with insert for glass or plastic or film pattern 1828, and a printed single layer soft or hard shell case 1829 of one embodiment.

Stock Print Case and Stock Glass Selections:

FIG. 19 shows for illustrative purposes only an example of a stock print case and stock glass selections of one embodiment. FIG. 19 shows a continuation from FIG. 16 that shows electronically stitched digital device protective artwork case, tempered glass and downloadable image stock artwork design pattern selections 1990. The case, tempered glass and downloadable image stock artwork design pattern selections 1990 include a hard shell flower pattern 1900, a tempered glass front face flower pattern 1901, a downloadable image flower pattern 1902, a hard shell angular graphic pattern 1910, a tempered glass front face angular graphic pattern 1911, a downloadable image angular graphic pattern 1912, a hard shell ice cream cone pattern 1920, a tempered glass front face ice cream cone pattern 1921, a downloadable image ice cream cone pattern 1922, a hard shell overlapping leaf pattern 1930, a tempered glass front face overlapping leaf pattern 1931, a downloadable image overlapping leaf pattern 1932, a hard shell surfboard pattern 1940, a tempered glass front face surfboard pattern 1941, a downloadable image surfboard pattern 1942, a hard shell grinning face pattern 1950, a tempered glass front face grinning face pattern 1951, a downloadable image grinning face pattern 1952, a hard shell transparent petals pattern 1960, a tempered glass front face transparent petals pattern 1961, a downloadable image transparent petals pattern 1962, a hard shell tropical forest pattern 1970, a tempered glass front face tropical forest pattern 1971, a downloadable image tropical forest pattern 1972, a hard shell kissing face pattern 1980, a hard shell happy face pattern 1981, a hard shell grinning face pattern 1950, a hard shell smiling face pattern 1983, and a hard shell tongue out pattern 1984 of one embodiment.

Figure 20:
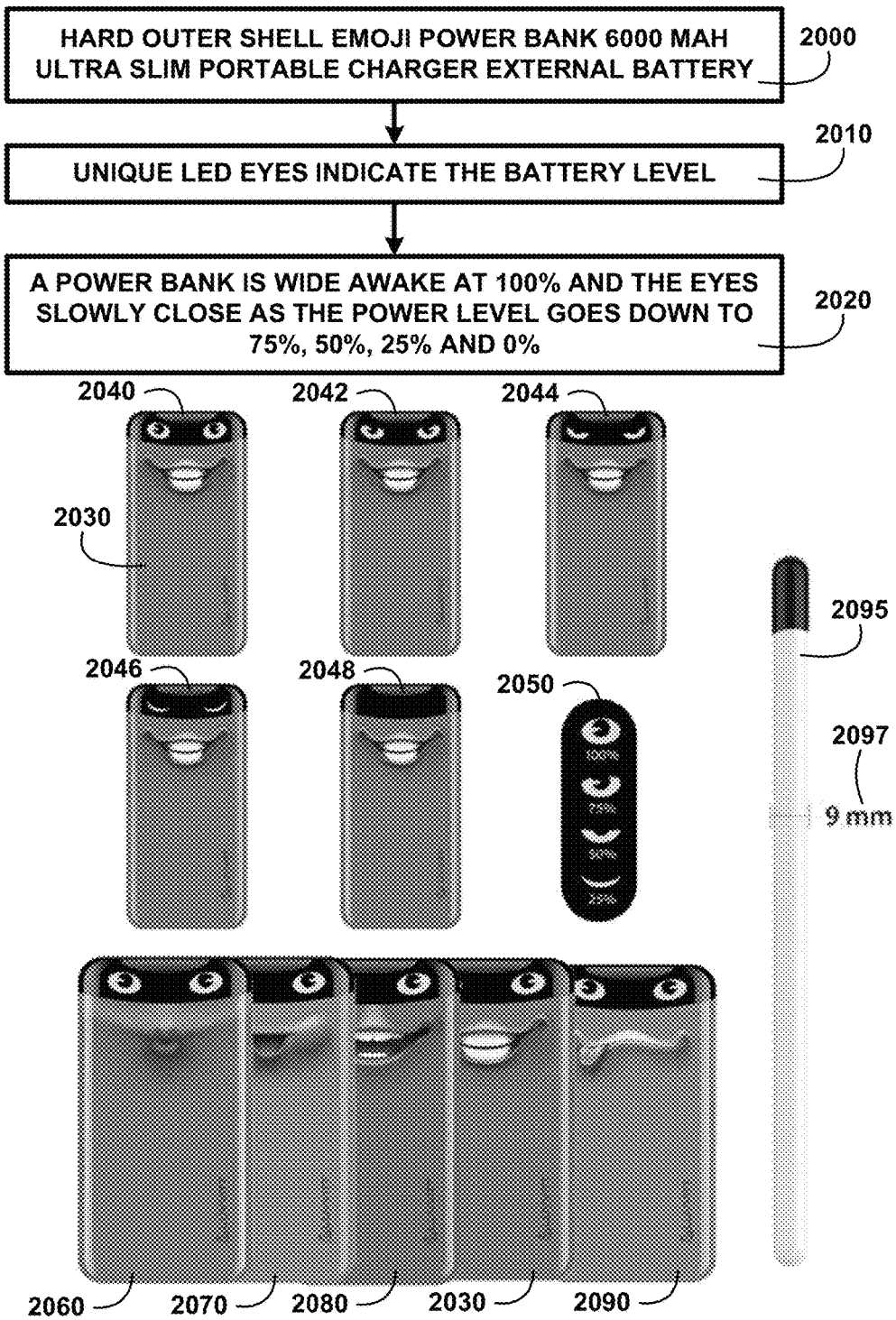
FIG. 20 shows for illustrative purposes only an example of a stock art design power bank with blinking LED eyes of one embodiment.

Hard Outer Shell Stock Art Design Power Bank with Blinking LED Eyes:

FIG. 20 shows for illustrative purposes only an example of a hard outer shell stock art design power bank with blinking LED eyes of one embodiment. FIG. 20 shows a digital device protective artwork case hard outer shell emoji power bank 6000 mAh ultra slim portable charger external battery 2000. This hard outer shell can be attached to the digital device protective artwork case flexible bumper 600 of FIG. 6A. The hard outer shell emoji power bank includes a unique LED eyes indicate the battery level 2010. A power bank is wide awake at 100% and the eyes slowly close as the power level goes down to 75%, 50%, 25% and 0% 2020. Illustrating the unique LED eyes battery level sequence shows a hard outer shell smiling face pattern 2030, LED eyes battery level 100% 2040, LED eyes battery level 75% 2042, LED eyes battery level 50% 2044, LED eyes battery level 25% 2046, LED eyes battery level 0% 2048. The battery level indicator is displayed on an LED eyes battery level chart 2050. Various stock artwork designs include a hard outer shell kissing face pattern 2060, a hard outer shell happy face pattern 2070, a hard outer shell grinning face pattern 2080, a hard outer shell smiling face pattern 2030, and a hard outer shell tongue out pattern 2090. A hard outer shell emoji power bank side view 2095 show a 9 mm depth dimension 2097 of one embodiment.

Figure 21A:
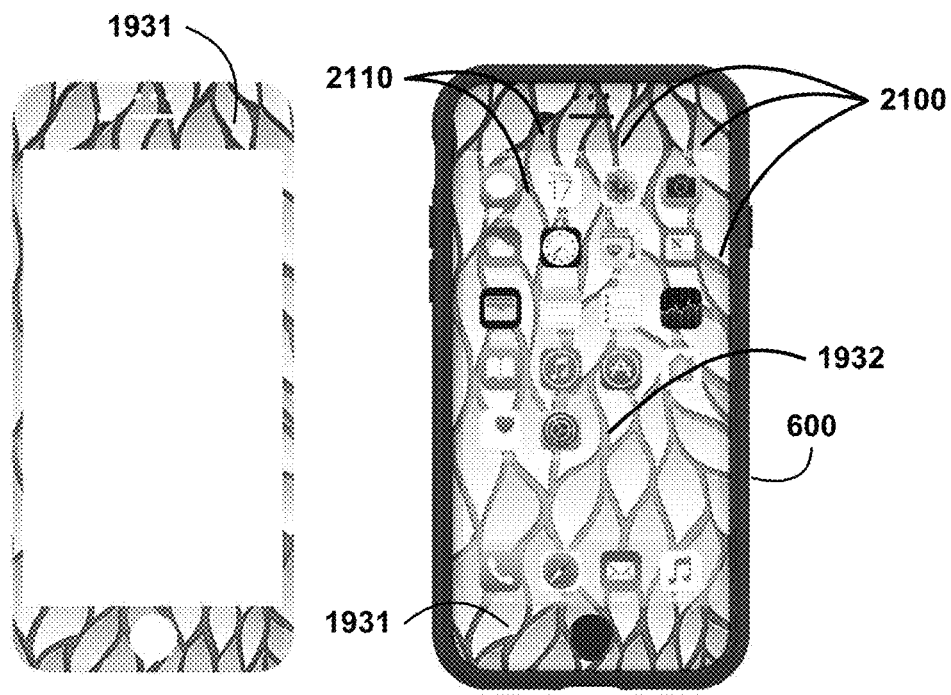
FIG. 21A shows for illustrative purposes only an example of electronically stitched artwork designs of one embodiment.

Electronically Stitched Artwork Designs:

FIG. 21A shows for illustrative purposes only an example of electronically stitched artwork designs of one embodiment. FIG. 21A shows the digital device protective artwork case tempered glass front face overlapping leaf pattern 1931 stock artwork design. The tempered glass front face overlapping leaf pattern 1931 stock artwork design is shown attached to the digital device protective artwork case flexible bumper 600. Shown in this example is the downloadable image overlapping leaf pattern 1932 downloaded and displayed on the user digital device installed in the digital device protective artwork case flexible bumper 600 behind the tempered glass front face overlapping leaf pattern 1931. Corresponding electronically stitched artwork design images 2110 of the tempered glass front face overlapping leaf pattern 1931 and the downloadable image overlapping leaf pattern 1932 home screen are shown. Points of the electronically stitched artwork design transitional content 2100 illustrate the seamless transitions of the overlapping leaf pattern from the tempered glass front face overlapping leaf pattern 1931 and downloadable image overlapping leaf pattern 1932 home screen. The electronically stitched artwork design transitional content 2100 is created with seamless artwork designs between each of the adjacent digital device protective artwork case components providing the user with a fashionable digital device protective artwork case of one embodiment.

Figure 21B:
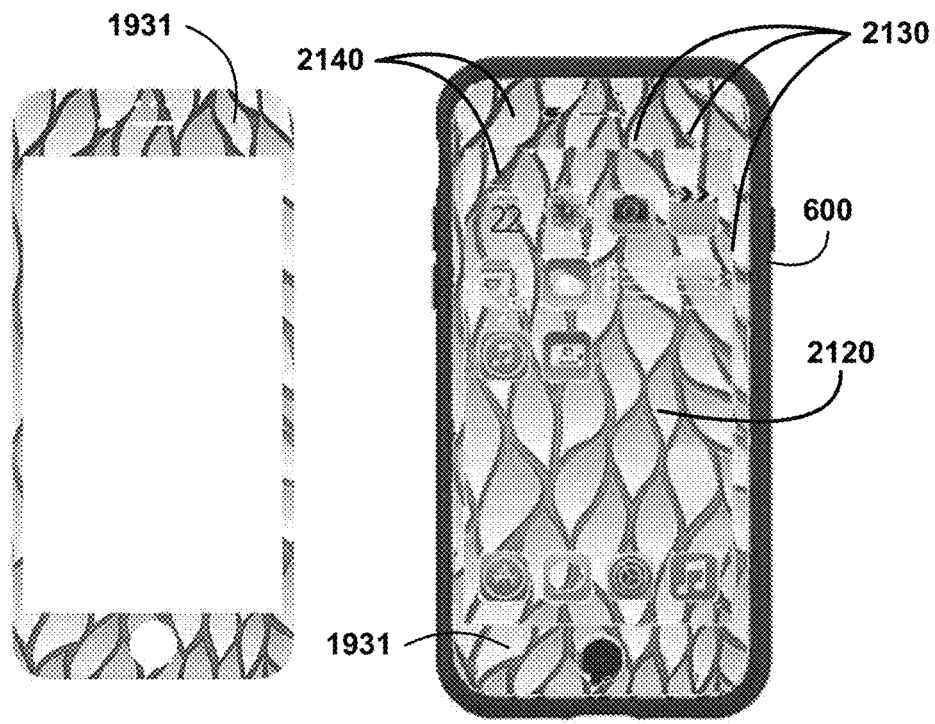
FIG. 21B shows for illustrative purposes only an example of artwork design applications without electronic stitching of one embodiment.

Artwork Design Applications without Electronic Stitching:

FIG. 21B shows for illustrative purposes only an example of artwork design applications without electronic stitching of one embodiment. FIG. 21B shows the tempered glass front face overlapping leaf pattern 1931 also when it is attached to the digital device protective artwork case flexible bumper 600. Additionally shown is a home screen artwork design application without electronic stitching 2120. Corresponding non-electronically stitched artwork design images 2140 clearly show points of non-electronically stitched artwork design misalignments 2130. The lack of the seamless transitions created using the electronic stitching produces an unappealing abrupt incongruous misaligned meeting of the artwork design images and patterns. A user looking at the poor non-seamless application of artwork designs throughout the day will soon tire of the lack of visual appeal of one embodiment.

Figure 22:
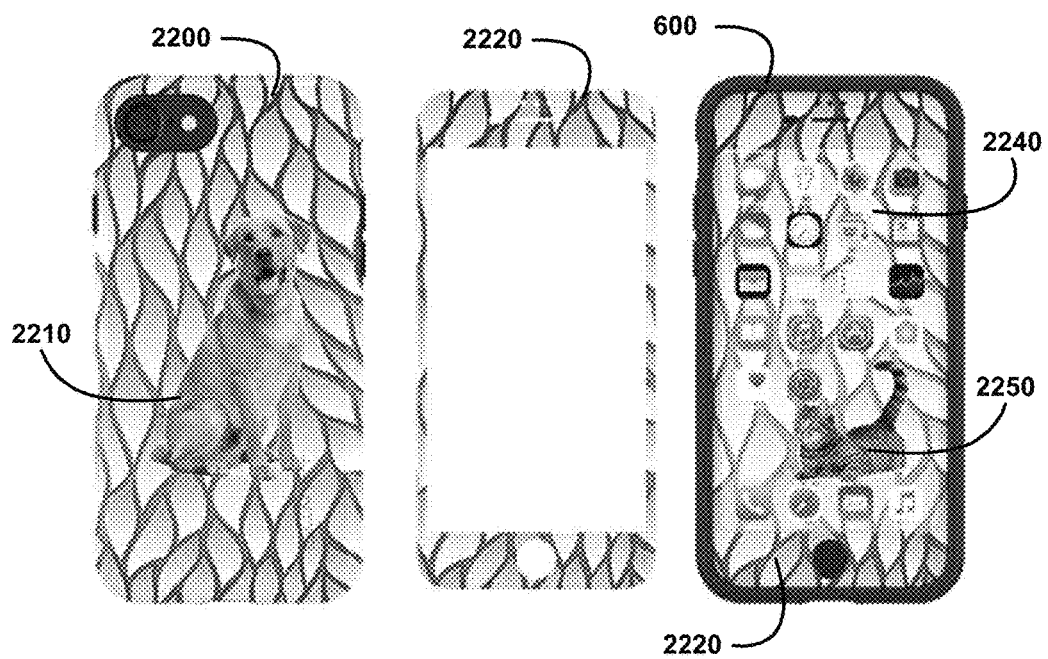
FIG. 22 shows for illustrative purposes only an example of seamless artwork design applications with personalized middle section images of one embodiment.

Personalized Middle Section Images:

FIG. 22 shows for illustrative purposes only an example of seamless artwork design applications with personalized middle section images of one embodiment. FIG. 22 a digital device protective artwork case back with a seamless artwork design 2200. Integrated into the seamless artwork design is for example a user's pet dog image 2210. Also showing is a tempered glass front face with the same seamless artwork design 2220. The tempered glass front face with the same seamless artwork design 2220 is installed on the bumper 600. A downloadable home screen image 2240 is displayed with for example an integrated user's pet cat image 2250. An digital device protective artwork case back with a seamless artwork design 2200 with an integrated middle section of for example a user's pet dog image 2210 and a downloadable home screen image 2240 with an integrated middle section of for example a user's pet cat image 2250 can be installed to form one digital device protective artwork case set of one embodiment.

Figure 23:
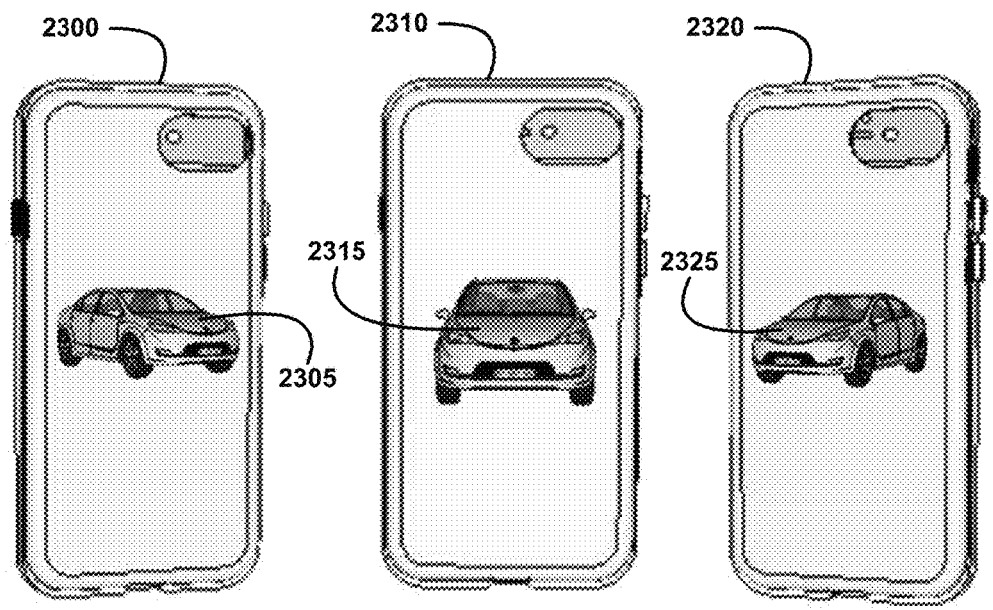
FIG. 23 shows for illustrative purposes only an example of seamless artwork design applications with holographic images of one embodiment.

Seamless Artwork Design Applications with Holographic Images:

FIG. 23 shows for illustrative purposes only an example of seamless artwork design applications with holographic images of one embodiment. The seamless artwork design applications can include integrated middle sections of other images and maintain the seamless electronically stitched edges. FIG. 23 shows a digital device protective artwork case back in a right tilt view 2300 with an integrated middle section holographic artwork design pattern car in a corresponding right tilt view 2305. Showing in the middle of FIG. 23 is a digital device protective artwork case back in a no tilt view 2310 with an integrated middle section holographic artwork design pattern car in a corresponding no tilt view 2315. On the right of FIG. 23 is a digital device protective artwork case back in a left tilt view 2320 with an integrated middle section holographic artwork design pattern car in a corresponding left tilt view 2325 of one embodiment.

Figure 24:
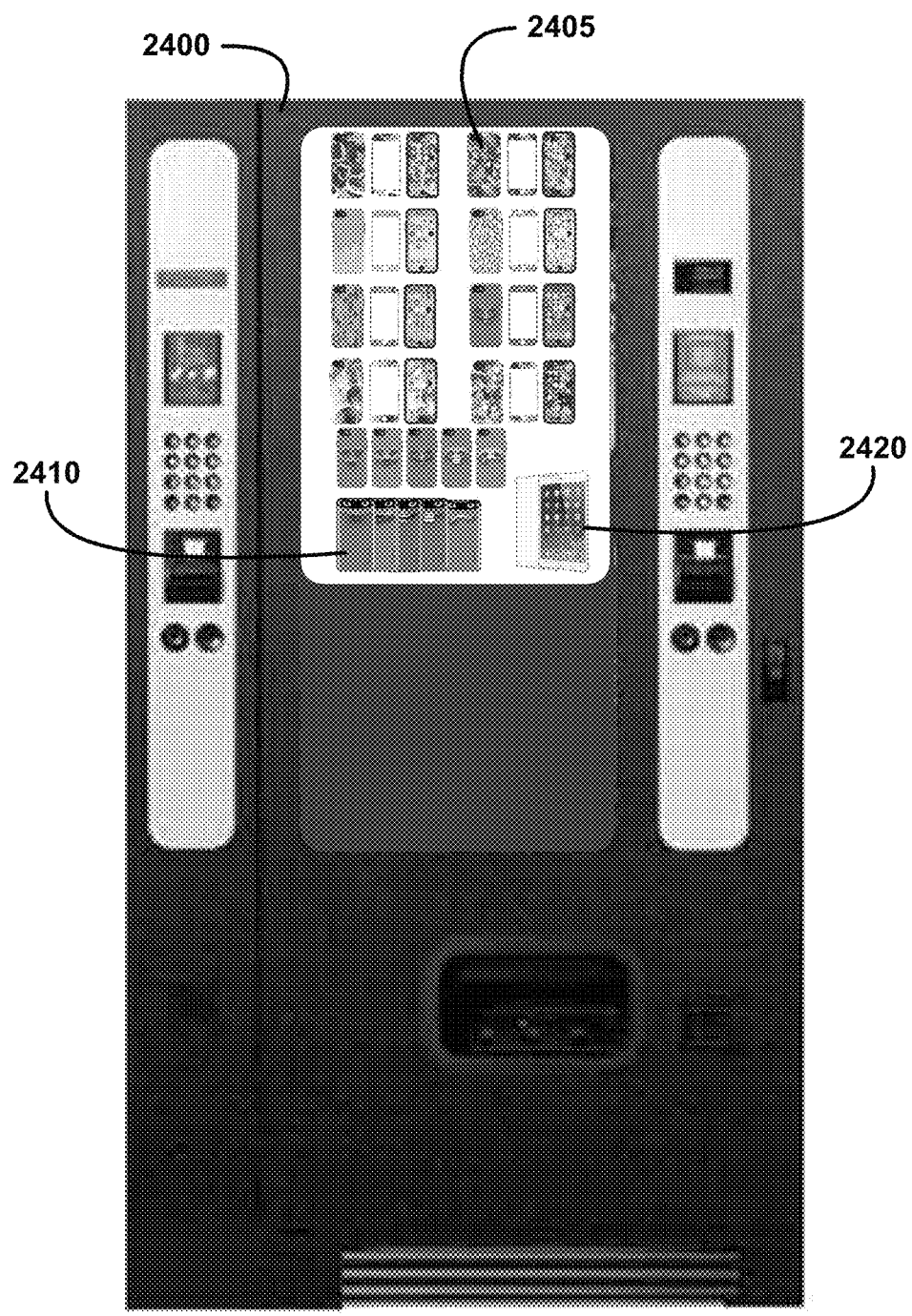
FIG. 24 shows for illustrative purposes only an example of a digital device protective artwork case vending machine of one embodiment.

Digital Device Protective Artwork Case Vending Machine:

FIG. 24 shows for illustrative purposes only an example of a digital device protective artwork case vending machine of one embodiment. FIG. 24 shows for example a digital device protective artwork case vending machine 2400 where a user can purchase a digital device protective artwork case. The digital device protective artwork case vending machine 2400 includes a tough screen display with digital device protective artwork case stock artwork designs and styles and other products. A user can touch the selection to see the price, pick from a selection of digital devices that is also displayed with the price information, insert a credit or debit bank card or cash, and their selection for the specified digital device is dispensed at the bottom of the digital device protective artwork case vending machine 2400.

User selections can include digital device protective artwork case stock artwork design pattern selections 2405, a hard outer shell EMOJI Power Bank 6000 mAh Ultra Slim Portable Charger External Battery with unique LED eyes indicate the battery level 2410 and a tablet clear flexible rubber digital device protective artwork case 2420.

In another embodiment the device protective artwork case vending machine 2400 is wirelessly connected to the digital device protective artwork case website 110. The user can touch a selection of the digital device protective artwork case style and when that image is displayed choose an option to personalize the digital device protective artwork case artwork design. The user makes the payment for the personalized digital device protective artwork case. The device protective artwork case vending machine 2400 includes a scanning section on the display panel on which the user may place the personalized artwork image. The image is transmitted to the digital device protective artwork case website 110 which processes the personalized artwork image into an electronically stitched artwork design. The user personalized electronically stitched artwork design is transmitted to the device protective artwork case vending machine 2400 where the user personalized electronically stitched artwork design is applied to the user selected digital device protective artwork case style and after a short drying process is dispensed to the user.

In another embodiment the functions of the device protective artwork case vending machine 2400 can be installed in a kiosk with a representative on duty to assist a user.

The foregoing has described the principles, embodiments and modes of operation of the embodiments. However, the embodiments should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method for creating a digital device protective artwork case with fashionable artwork designs to personalize and protect a user digital device, comprising:

creating at least one first mold conforming to specific digital device model shapes and sizes and depositing a flexible rubber including a thermoplastic polyurethane into the first mold to form a digital device protective artwork case with a shock absorbing bumper core;

creating at least one second mold conforming to specific digital device model shapes and sizes and depositing a hard setting plastic including a polycarbonate into the second mold to form a digital device protective artwork case hard outer shell attachable to the back of the shock absorbing bumper core;

creating a hard outer shell portable charger external battery with exterior stock art design patterns and a LED battery level indicator system appearing as blinking LED eyes which close in relation to a diminishing charge remaining on the portable charger external battery;

cutting a piece of tempered glass conforming to specific digital device model shapes and sizes and drilling openings to specific digital device model operating features to form a front face including a front face insert including printed film and plastic front face inserts of the digital device protective artwork case;

creating a collection of stock artwork designs to form an electronically stitched seamless artwork design that wraps around the digital device protective artwork case, and wherein a user can select a stock artwork design;

creating a digital device protective artwork case website with at least one processor, at least one database, at least one communication device and internet connection to communicate with users for order processing and user selections of digital device protective artwork case styles and stock artwork designs for decorating the digital device protective artwork case components;

creating at least one manufacturing data interface to transfer user selections of digital device protective artwork case styles and stock artwork designs to at least one manufacturing device including at least one electronically stitched image application device and at least one mold material depositing device;

processing user submitted user personalized artwork designs for creating and applying an electronically stitched seamless wraparound user artwork design to the digital device protective artwork case components, wherein applying includes printing, painting or transferring;

creating at least one third mold conforming to specific digital device model shapes and sizes for creating a clear digital device protective artwork case with a cushioning bumper protection with flexible shock absorbing corners and a ribbed ruffled design on the front and back of the case side edges to improve a user grip; and;

digitizing and electronically stitching stock and user artwork designs for creating downloadable formats of the artwork designs that will provide a user with an image for digital device home screen and screen saver usages that seamlessly integrate with digital device protective artwork case components with coordinating artwork designs.

2. The method of claim 1, wherein creating a hard outer shell portable charger external battery includes placing in the interior of the second mold a portable charger external battery with connections to a LED battery level indicator system to be coupled to connections on a back exterior of the hard outer shell before depositing the hard setting plastic and depositing a hard setting plastic into the second mold with the portable charger external battery with connections to a LED battery level indicator system.

3. The method of claim 1, wherein creating a clear digital device protective artwork case includes depositing a clear flexible rubber including a thermoplastic polyurethane into each corner of the third mold wherein each corner extends outward from the inner plane face of the mold to form a protrusion on each side of the mold corners and depositing a clear flexible rubber including a thermoplastic polyurethane into the inner plane face remainder of the third mold to form a digital device protective artwork case with a cushioning bumper protection with flexible shock absorbing corners and a ribbed ruffled design on the front and back of the case side edges to improve a user grip.

4. The method of claim 1, wherein creating at least one manufacturing data interface to at least one manufacturing device includes for depositing of material into the molds for fabricating digital device protective artwork case components.

5. The method of claim 1, wherein drilling openings in a piece of tempered glass to specific digital device model operating features includes a camera lens, microphone and listening features.

6. The method of claim 1, wherein creating at least one manufacturing data interface to at least one manufacturing device for selecting molds matching the user selected case styles and conforming to user specific digital device model shapes and sizes for fabricating digital device protective artwork case components.

7. The method of claim 1, wherein creating at least one manufacturing data interface to at least one manufacturing device for selecting stock artwork designs matching the user selected stock artwork designs, and at least one processor for creating electronic stitching of the user selected stock artwork design and includes at least one image application device for applying the electronically stitched user selected stock artwork design to the digital device protective artwork case components including printing, painting or transferring electronically stitched user selected artwork design.

8. The method of claim 1, wherein digitizing and electronically stitching the stock and user artwork designs including integrated middle section images including holographic images for creating downloadable formats of the artwork designs includes formats for user digital devices.

9. The method of claim 1, wherein creating at least one first mold conforming to specific digital device model shapes and sizes to form a digital device protective artwork case with a shock absorbing flexible bumper core includes at least one first mold wherein a clear or painted tempered glass can be attached using an attachment ledge on the front and back faces of the shock absorbing flexible bumper core.

10. The method of claim 1, further comprising a digital device protective artwork case front face made of a clear film and alternatively a film with an applied electronically stitched artwork design.

11. A method for creating a mobile phone case, comprising:

providing a website for allowing a user to create an electronic order for a protective artwork case for a mobile phone device wherein the website includes user selected fashionable artwork designs conforming to specific mobile phone device model shapes and sizes;

wherein the website includes user selectable options for customizing the order of the protective artwork case and wherein the case includes a flexible rubber shock absorbing bumper core, a flexible rubber back attachable to the shock absorbing bumper core, a hard outer shell made of a hard setting plastic, and a front face made of tempered glass fabricated using at least one manufacturing device;

providing at least one electronically stitched seamless artwork design configured to seamlessly wraparound protective artwork case components;

using at least one processor, at least one database, at least one communication device and internet connection, at least one digital electronic stitching artwork design processor, and at least one manufacturing data interface for operation of the website;

wherein the protective artwork case includes a hard outer shell portable charger external battery with exterior stock art design patterns and a LED battery level indicator system appearing as blinking LED eyes which close in relation to a charge remaining of the portable charger external battery; and using at least one digitized electronically stitched artwork design downloadable image formatted for a home screen and a screen saver that is electronically stitched to the match the user selected artwork design on the case.

12. The method of claim 11, wherein the at least one processor used by the website is configured to include at least one order processing processor, at least one digital electronic stitching processor, at least one processor to query the at least one database.

13. The method of claim 11, wherein the at least one database used by the website is configured for transmitting website stored user selectable stock artwork designs and website stored user selectable digital device protective artwork case styles to a user and to the at least one manufacturing data interface.

14. The method of claim 11, wherein the at least one digital electronic stitching artwork design processor is configured for digitizing and electronically stitching stock and user artwork designs and transmitting the digitized and electronically stitched stock and user artwork designs using the at least one manufacturing data interface to the at least one manufacturing device for applying to the digital device protective artwork case components.

15. The method of claim 11, further comprising providing at least one mold material depositing device configured for depositing materials including thermoplastic polyurethane (TPU) into a first mold, polycarbonate into a second mold, and a clear flexible rubber including thermoplastic polyurethane (TPU) into a third mold, each deposition of materials to fabricate digital device protective artwork case components conforming to digital device shapes and sizes.

16. A method for creating a customized mobile phone case, comprising:

fabricating digital device protective artwork case components conforming to digital device shapes and sizes;

coordinating with the fabricating to create digitally stitched images the phone case using an electronically stitched image application device and a mold material depositing device;

providing an interactive website configured to receive user selections of protective artwork case styles and stock artwork designs;

gathering the user selections via at least one order processing processor, at least one digital electronic stitching processor, at least one database, at least one communication device, at least one internet connection and at least one manufacturing data interface to transmit user selections of digital device protective artwork case styles and electronically stitched stock artwork designs to the electronically stitched image application device; and fabricating protective artwork case components based on the gathered user selections from the website, wherein the fabricated phone case includes a shock absorbing flexible bumper core with flexible buttons to operate digital device buttons, a flexible back, a hard outer shell back, a hard outer shell portable charger external battery with blinking LED eyes battery level indicators, a tempered glass front face, a clear flexible rubber digital device protective artwork case.

17. The method of claim 16, further comprising applying the various stock electronically stitched seamless wrap-around artwork designs to the digital device protective artwork case components using the electronically stitched image application device.

18. The method of claim 16, further comprising digitizing and electronically stitching the various stock artwork designs for creating downloadable formats.

19. The method of claim 16, further comprising depositing materials including thermoplastic polyurethane (TPU) into a first mold, polycarbonate into a second mold, and a clear flexible rubber including thermoplastic polyurethane (TPU) into a third mold, each deposition of materials to fabricate digital device protective artwork case components conforming to digital device shapes and sizes.

\* \* \* \* \*